United States Patent [19]

Rawson, III et al.

[11] Patent Number: 5,535,401
[45] Date of Patent: Jul. 9, 1996

[54] METHOD AND SYSTEM OF POWER AND THERMAL MANAGEMENT FOR A DATA PROCESSING SYSTEM USING OBJECT-ORIENTED PROGRAM DESIGN

[75] Inventors: Freeman L. Rawson, III, Boca Raton; Guy G. Sotomayor, Jr., West Palm Beach, both of Fla.

[73] Assignee: International Business Machines Corporation, Armonk, N.Y.

[21] Appl. No.: 223,498

[22] Filed: Apr. 5, 1994

[51] Int. Cl.$^6$ .................................................. G06F 1/32
[52] U.S. Cl. ........................................ 395/750; 364/707
[58] Field of Search ...................... 395/750, 62; 364/707

[56] References Cited

U.S. PATENT DOCUMENTS

| | | | |
|---|---|---|---|
| 4,495,568 | 1/1985 | Gilbert et al. | 395/575 |
| 4,611,289 | 9/1986 | Coppola | 364/492 |
| 4,677,566 | 6/1987 | Whittaker et al. | 364/492 |
| 4,747,041 | 5/1988 | Engel et al. | 395/750 |
| 4,748,559 | 5/1988 | Smith et al. | 395/750 |
| 5,019,996 | 5/1991 | Lee | 364/483 |
| 5,142,684 | 8/1992 | Perry et al. | 395/750 |
| 5,167,024 | 11/1992 | Smith et al. | 395/375 |
| 5,230,055 | 7/1993 | Katz et al. | 395/750 |
| 5,291,607 | 3/1994 | Ristic et al. | 395/750 |
| 5,396,443 | 3/1995 | Mese et al. | 364/707 |
| 5,404,543 | 4/1995 | Faucher et al. | 395/750 |

OTHER PUBLICATIONS

Object–Oriented Modeling & Design, Rumbouch et al, Inside Cover, pp. 89–91, 1991.

Primary Examiner—Jack B. Harvey
Assistant Examiner—Paul R. Myers
Attorney, Agent, or Firm—Bruce D. Jobse; Craig J. Yudell; Andrew J. Dillon

[57] ABSTRACT

A power management architecture in a data processing system comprising physical devices having at least one state, each state has corresponding power value, and where a system state is defined as the set of all current states of the physical devices. Power objects and thermal objects, each corresponding to a physical device, contain information about the power requirements and thermal characteristics of each possible state for that physical device. The power and thermal objects also describe the allowed state transitions from each possible state to another state, and the power requirements and thermal characteristics of all possible state transitions. Also communicated is the current state of each physical device. Event means generate signals indicating the occurrence of an event in the system. A policy module contains rules, implementing the power management, that direct an action, the rules being a function of events and of power object information. A controller, in communication with the physical devices, the thermal and power objects, the event means, and the policy module, changes the state of any one of the physical devices in response to an event. The controller determines whether to change a physical device state based on the policy module rules.

38 Claims, 15 Drawing Sheets

Fig. 10

| | Event | Conditions | Action |
|---|---|---|---|
| 1. | CPU became busy | if power load on battery is low | place CPU into state #3 |
| 2. | CPU became busy | if power load on battery is high | place CPU into state #4 |
| 3. | CPU is idle | | place CPU into state #5 |
| 4. | CPU load is low | | place CPU into state #4 |
| 5. | CPU load is high | if power load on battery is low | place CPU into state #3 |
| 6. | Disk became busy | | place Disk into state #15 |
| 7. | Disk has pending work | | place Disk into state #15 |
| 8. | Disk is idle | if disk is expected to be idle for > $(t_{sd}*P_{sd}+t_{su}*P_{su})/P_s$ seconds | place Disk into state #16 |
| 9. | Key has been pressed | | place keyboard into state #24, if CPU is in state #5, put it into state #4 |
| 10. | Keyboard is idle | | place keyboard into state #25 |

METHOD AND SYSTEM OF POWER AND THERMAL MANAGEMENT FOR A DATA PROCESSING SYSTEM USING OBJECT-ORIENTED PROGRAM DESIGN

BACKGROUND OF THE INVENTION

1. Technical Field

The present invention relates in general to power management of a data processing system, and in particular to a method and system for object oriented power management of a data processing system.

2. Description of the Related Art

Managing and conserving the usage of electrical power in computing equipment such as portable laptops and tablets is a primary engineering design concern. Of particular concern in mobile computing equipment, which typically operate with a battery as its primary source of power, is the conservation of electrical power in order to maximize operating time by efficiently managing and using the battery power. For example, one technique of power management powers down components of the computer system remaining idle for a specified period of time.

In many portable units, a self supporting power source, such as a battery, functions as the main power source when the unit is decoupled from its main external power source, such as 110 volts AC. In some instances, the battery functions as an auxiliary power source to maintain certain critical circuits active when the unit experiences a sudden loss of power. This keeps the unit's memory alive to retain any information stored in the memory which would be lost otherwise. Advanced management schemes monitor various functions and remove power from those elements when they are not needed to extend the time period that the device could operate from its internal power source. Further, a time out scheme puts the unit in a stand-by mode after a certain time period in order to preserve power. For example, it is common for modern laptop computers to remove power from their display screen when the computer remains idle for a specified period of time.

Laptops are designed to operate for a certain number of hours from its internal power source. In order to extend the self-sustaining time period of these laptops while keeping the battery size and weight to a minimum, a sophisticated power management scheme is required to provide power only to those circuits and devices which require such power and to remove power or make a given circuit enter into a low power consumption mode when that circuit is not needed. The management scheme must also continually monitor the various circuits and devices in order that power can be reapplied immediately to activate such circuits and devices when needed.

More significantly, large modern mainframe computers have complex configurations which require large amounts of power. Management and budgeting of the available power to these large systems presents similar problems as those presented in addressing laptop power management. For example, the computer system may have a limited supply of power to operate the system which has a potential consumption that far exceeds this power supply. A power management system is required to budget the power throughout the system.

The current generation of power management techniques have a number of problems. The first problem with modern power management systems in mainframe computers and laptops alike is that the power management architecture is system specific. It would be desirable to provide a power management architecture which can be utilized with any computer system. Further, it would be desirable to provide a power management architecture which can operate on any computer system but which can be customized to any desired configuration by designing the rules to which the architecture responds so that they meet the desired power criteria optimized for the computer system.

Thus, it would be desirable to provide the power management architecture which has broad application to different types of systems. The operating system or kernel to which an architecture is designed may eventually run on a variety of computer systems. This requires that the power management architecture be general and enduring in systems ranging from a hand-held relatively fixed function system to a high powered system that has thousands of processors. Each type of system imposes its own key requirements that must be satisfied by the power management architecture. The following list of system types describes each type of system and what its key requirements might be.

1. MPP Systems

These systems are "Massively Parallel Processor" systems that may contain hundreds or thousands of processing elements. The goal of these types of systems is to provide "raw" performance. That performance is usually oriented towards processing power but usually has fairly high bandwidth I/O for feeding the processor performance. Anything that would tend to inhibit or limit the performance of the system is to be avoided. A power management architecture must be capable of not interfering with the system's performance.

2. Server Systems

These systems are used for delivering some service to a number of other client systems. Typically they are used as a file service providing (relatively) large numbers of files to multiple clients. However this type of system can be used to provide any type of service that is to be shared (i.e. printers). The main requirement that these systems have is that the data is reliable and the service is available a high percentage of the time. A power management architecture can augment the needs of a server system by notifying the system of impending power outages and possibly switching to backup power sources to "ride out" the power outage.

3. Desktop Systems

These systems are used primarily by end users and are the systems that end users typically interact with. While there are many attributes about this type of system that concern end users, the one that is probably the most important for end user satisfaction is response time. That is, when a user initiates some action on the system, the time in which it takes for the user to "see" some response in large part determines the user's satisfaction with the system and greatly influences the user's perception of the speed or performance of the system. A power management architecture must not cause large (perceptible) increases in the response time of this type of system.

4. Laptop Systems

These types of systems are similar to desktop systems in that they are used by end users. However, unlike desktop systems (which remain largely in one location) these systems are mobil. That is they are moved around alot. As part of the mobility of these systems, there is a portable power supply (usually in the form of a battery). As in desktop systems, laptop systems have response time as an important criteria. However, because of their mobility, there is the requirement that the portable power supply provide power for as long a period of time as possible. This is sometimes at odds with the desire for fast response time, but some response time is usually traded off to obtain longer battery life. These types of systems are where the majority of the focus of power management has been placed in the past. This will continue to be true until either power consumption of the system itself can be greatly reduced so as to increase battery life, or battery technology becomes sufficiently advanced to where power consumption is no longer a concern, or more likely some combination of refinement where power consumption is somewhat reduced and battery technology is refined to yield the desired "long" battery life.

5. Embedded Systems

These types of systems fall into two sub-categories. "Single board computers" that are usually used in some type of process control such as plant floor controllers, and "controllers" that are used as part of a sub-system in another type of system such as a disk controller in a server system. The main focus of these types of system is usually real-time. That is, the software has certain expectations of the system performance characteristics that it relies on to achieve correct operation (i.e. program correctness is judged not only on algorithmic correctness but also contains a time component). A power management architecture must allow for real-time applications to operate in a manner so as to allow them to meet their timing criteria.

6. PDA Systems

These systems are "Personal Digital Assistants" or hand-held systems. They are much smaller than laptop systems and are usually not as flexible as their more general counterpart systems. There are two main requirements that PDA systems exhibit. The first is extremely long battery life. If a laptop system's battery life is measured in hours or a few days, a PDA system's battery life is measured in at least months. Performance of the system is usually traded off to achieve a long battery life. The other requirement is what is called "instant on." That is, the "boot" sequence for a PDA is measured in fractions of a second.

In addition to laptops and PDA's, power management is becoming important in all these types of systems. In all systems, there needs to be a power supply. In stationary systems it is the power supply that converts the wall supply (120 V, 60 HZ in the U.S.) to the various DC voltages needed internally in the system. The more current required for a given voltage, the larger the power supply. Larger power supplies generally cost more than smaller power supplies. To keep the cost of the system down, a manufacturer will use the smallest power supply that is believed to get the job done. However, the end user may wish to configure a system that can consume more power than the supply can provide. Historically, the user would usually resort to a purchasing a system with a larger power supply at greater cost. It would be desirable to have a system that budgets power in the system to solve this problem.

Another problem may arise in a system using a wall supply. A power supply that is capable of producing more power internal to the system, by necessity must require more input power. In certain situations, it is not possible to get more input power. Take for example an installation that has 100 systems that each consume 500 watts. This results in an overall power consumption of 50 KW. If the building that these systems is located in is capable of supporting a 60 KW load, everything is fine. But if those systems were to be replaced with systems that consume 750 watts each, there would be a problem because the total power consumption would be 75 KW which is 15 KW over what the building can support. This is why one sees more and more of the low power consuming "green machines" appearing. Therefore, power management is important to all types of systems and not just laptops and PDAs.

The power management architecture must not rely on any implementation specifics in order to define the architecture. For example, some processor architectures have specific additions to deal with power management (such as special execution modes for power management code). The power management architectural definition must not presume particular processor architectural features. This would severely limit the applicability of the architecture to other processor architectures.

Machines like the IBM Thinkpad series laptops are based on the Intel Advanced Power Management Architecture and its precursors. These techniques are limited to specialized Intel architecture processors in the SL series and do not work for software systems that are based on open systems technology.

Advanced Power Management uses a specialized processor mode called System Management Mode to execute code that handles power events. Unfortunately, the use of such a mode violates the architectural principles of open systems. Open systems assume that they have complete control over processor operation. They execute solely in the ordinary privileged mode of the machine, generally with the address translator active. In the presence of real time work, all the scheduling and all the algorithms used to manage the processor resources are invalidated if the hardware enters System Management Mode.

Moreover, on multiprocessor systems, if one processor enters System Management Mode, the other processors in the multiprocessor complex may conclude that it has failed and attempt to eliminate it from the system. Should the process ever resume normal execution, the system becomes inoperable. In addition, if a processor enters system management mode while processing in a multiprocessor complex, deadlock may occur during certain particular types of critical sections of the process. For instance, if the operating system kernel is doing a Translation Lookaside Buffer shootdown, processors go through a sequence of spin and acknowledge cycles. Should a processor that is spinning enter system management mode, all of the processors in the system can wind up spinning.

Finally, Advanced Power Management depends upon the existence and use of a Basic Input/Output System (BIOS). Open systems do not use BIOS since they are portable, may offer real time support, execute on multiprocessor hardware and provide directly all of the functions of the BIOS layer. As can be seen by the problems detailed above, Advanced Power Management cannot be used on open systems.

When the notion of "real time" is introduced, traditional power management designs tend to break down, in that they would tend to solve the problem by either disallowing "real time" applications from running, or turning off power management. This results in a very sub-optimal solution. If one considers that multimedia is a real time application and that they are becoming more prevalent in the marketplace, then real time is very much a consideration that must be dealt with by a power management architecture. The reason that "real time" is hard when considered with power management, is that "real time" requires predictable availability of service (i.e. known subsystem response times). Traditional power management on the other hand is under no obligation to provide consistent subsystem response time, its goal is to reduce power at the expense of performance and subsystem response time and that those two parameters are likely to vary depending upon "perceived" system activity.

In addition to the non-portability of modern power management systems and the inability to budget the total power consumed in the system, current power management systems take no account of the power costs associated with making a transition from one power state to another, nor are they capable of budgeting power. The prior art is only capable of minimizing the power consumption of the computer system components. No value is placed on the power requirements of a given state, and state transitions are assumed to be of zero cost and instantaneous. For example, in an effort to minimize power consumption, the power management will assume that the disk drive consumes more power while in operation and much less when spun down. Thus, if the disk drive is not used for a time, the power management will shut the disk down. The problem with this simplistic approach to power management is that it does not take into consideration the power consumed while spinning the disk down or the power consumed while spinning the disk back up to be used again. Thus, if the disk drive consumes a different amount of power and takes some time to spin down and a different amount of power and time to spin up, the power management architecture should take these costs into account when determining the desirability of shutting down the disk drive to conserve power.

A related problem is that of thermal management. It would be desirable for the power management system to take into account the thermal affects on power consumption and supply, component reliability and overall system performance when making decisions about the proper distribution and power throughout the computer system.

Therefore, it would be desirable to provide a power management architecture for a data processing system which is not hardware specific. This would remove the need to redesign the power management architecture for each computer application. By making the power management more portable across platforms, its structure would be simplified, allowing more complex control functions to be easily incorporated into the power management. It would further be desirable for such a system to budget the available power throughout the system. Still further, the power management architecture must not rely on any implementation specifics in order to define the architecture. The power management system would also take into account the power cost of state transitions. Last, the power management system should take into account the thermal effects on power consumption and supply.

SUMMARY OF THE INVENTION

According to the present invention, a power management architecture in a data processing system comprising physical devices has at least one state, each state having a corresponding power value, and where a system state is defined as the set of all current states of the physical devices. Power objects and thermal objects, each corresponding to a physical device, contain information about the power requirements and thermal characteristics of each possible state for that physical device. The power and thermal objects also describe the allowed state transitions from each possible state to another state and the power requirements and thermal characteristics of all possible state transitions. Also communicated is the current state of each physical device. Event means generate signals indicating the occurrence of an event in the system. A policy module contains rules, implementing the power management, that direct an action, the rules being a function of events and of power object information. A controller, in communication with the physical devices, the thermal and power objects, the event means, and the policy module, changes the state of any one of the physical devices in response to an event. The controller determines whether to change a physical device state based on the policy module rules.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10 displays a table of the logical steps performed by a controller when implementing an example of policy module rules;

DETAILED DESCRIPTION OF PREFERRED EMBODIMENT

The present invention of a power management architecture is described in its preferred embodiment as utilized in a laptop computer. However, it is understood that the present invention should not be limited to its application in laptop computers. The present invention is capable of operating in, and intended to be equally applicable to, any computer system. The present invention is a power management architecture which can be incorporated into any computer system because the mechanism of the architecture and the policy rules which direct that mechanism are independent, thus allowing the portability of the mechanism, the policy, or both.

Figure 1:
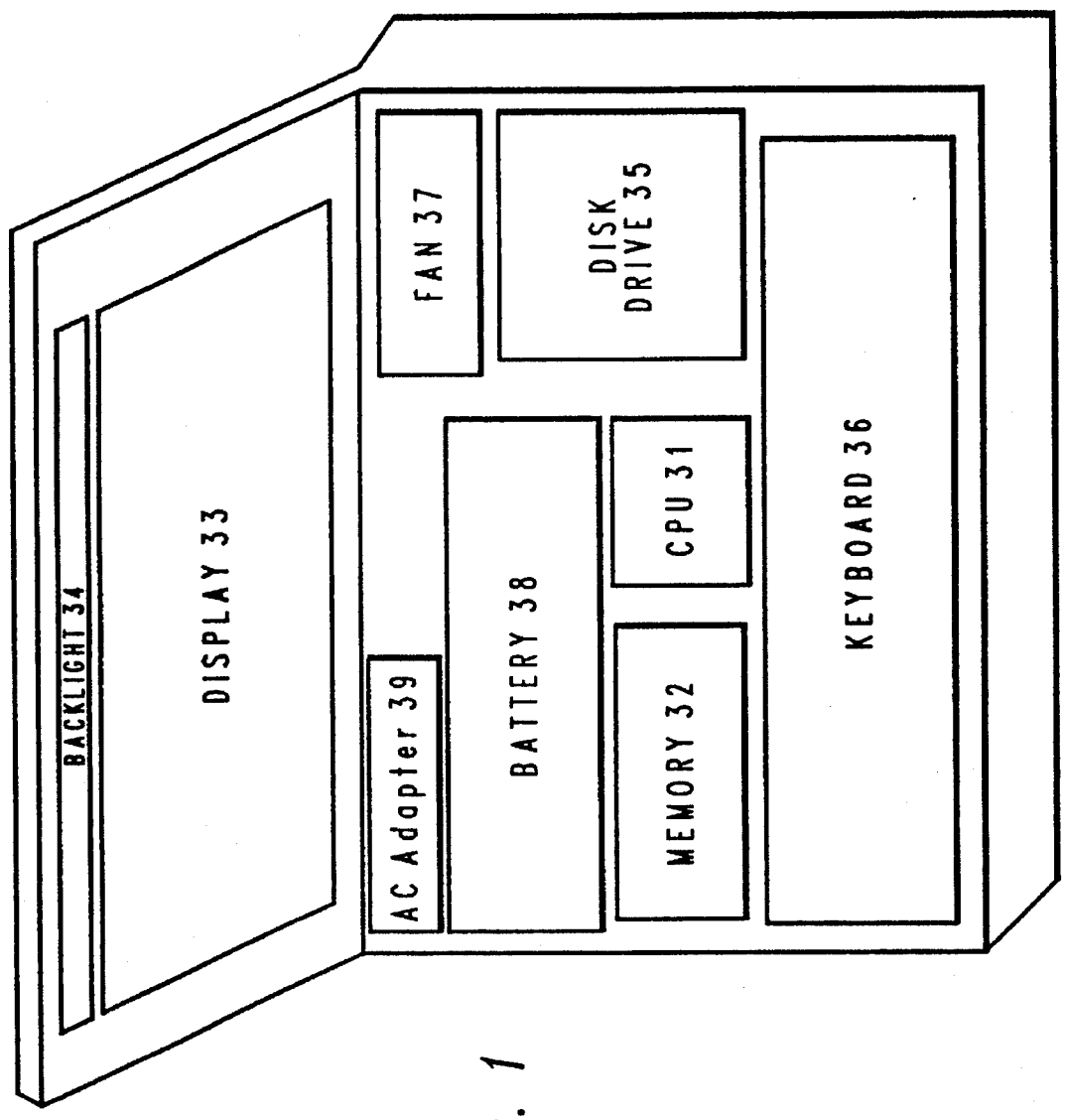
FIG. 1 depicts a diagram of the computer system components managed by the power management architecture of the present invention.

Referring now to the figures, and in particular to FIG. 1, there is depicted a diagram of the computer system components managed by a preferred embodiment of the power management architecture of the present invention. In this simplistic example, there are nine physical devices within a laptop computer managed by power management. FIG. 1 shows nine physical devices controlled by the power management architecture: CPU 31, memory 32, display 33, backlight 34 (wherein the back light provides back lighting to the display), disk drive 35, keyboard 36, fan 37, battery 38, and AC adapter 39. These components comprise elements which are power managed in a laptop computer. For each physical device there is an associated "device object" as seen in FIG. 2.

Figure 2:
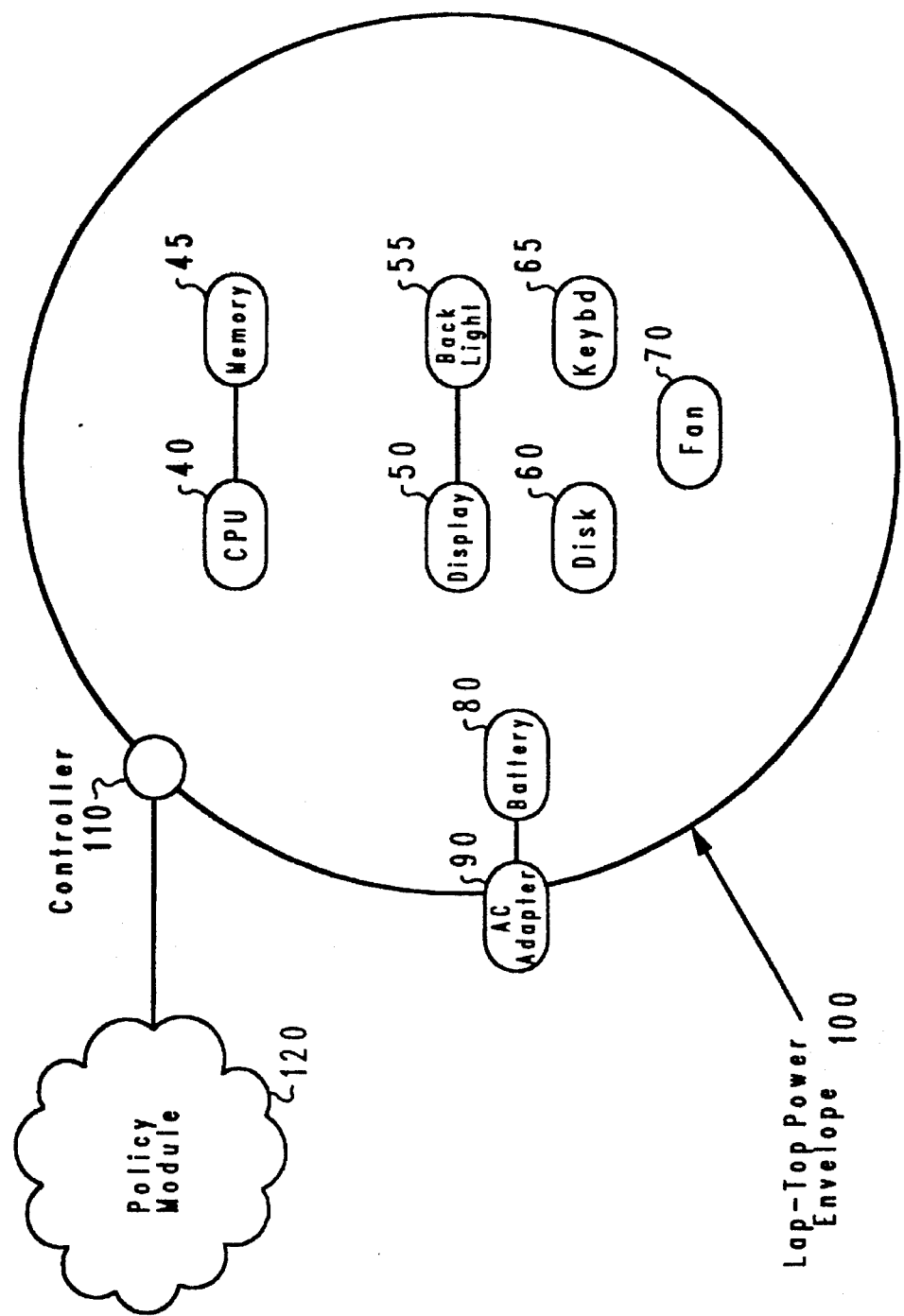
FIG. 2 depicts a diagram of the computer system power objects corresponding to the computer systems components managed by the power management architecture of the present invention.

FIG. 2 shows nine physical device objects: CPU object 40, memory object 45, display object 50, back light object 55, disk drive object 60, keyboard object 65, fan object 70, AC adapter object 90 and battery object 80. An object as used in this specification refers to a software module, containing data sets and possibly procedures, as that term is widely understood by computer programmers and software system engineers. Objects possess logical states and attributes, relations to other objects, and dynamic capabilities that may alter these across time. Each object is a potentially active, autonomously sequential agent, performing at most one activity at a time. Objects communicate by generating events. The nature of event generation varies, and may include point-to-point messages and non-specific requests. Events may trigger transitions or new events. Moreover, although the preferred embodiment uses object-oriented programming to enable the present invention, any method of programming or system design could be used to practice the power management architecture of the present invention in other embodiments.

The device objects are contained within power envelope 100. Power envelope 100 provides a means for logically grouping managed objects of a particular class. Envelopes are a convenient way to represent the topology of the system by dividing it into envelopes, and by defining the relationships between those envelopes. For example, power objects contained in an envelope either supply power to objects in that envelope or consume power from a supplier object. In this way, the power distribution topology of the system is defined by the nesting of power objects in the power envelope. Power envelope 100 is itself a "Managed Object." A Managed Object is an object controlled by the power management architecture through controller 110. The controller 110 is a processor or other logical engine for performing a procedure.

Policy module 120 is an object containing the rules by which the power management architecture distributes and controls power supply and consumption in the computer system, and maintains and controls thermal transfer in the computer system. Policy module 120 is directly fed into controller 110. Controller 110 carries out the desired power management by determining the configuration and current state of envelope 100 and calculating the actions dictated by the rules of policy module 120. The controller 110 then changes the state of the physical devices contained in the computer to implement the power management.

FIGS. 3–9 graphically depict the structure of software objects in the present invention. A solid-lined box represents a logical object as they are conceptualized in object-oriented programming. The dashed-lined boxes represent a fully specified instance of a real object. In other words, a dashed-lined box the actual software module or object that is implemented to practice the present invention. Each logical object contains fields presenting multiple attributes of that object. The logical objects are just a useful tool for grouping these attributes based on the type of physical device object but do not represent software implemented independent objects. The reference number used in referring to a logical object will be the number shown in the "id" field of the object. Objects without "id" fields have external reference numbers.

Figure 3:
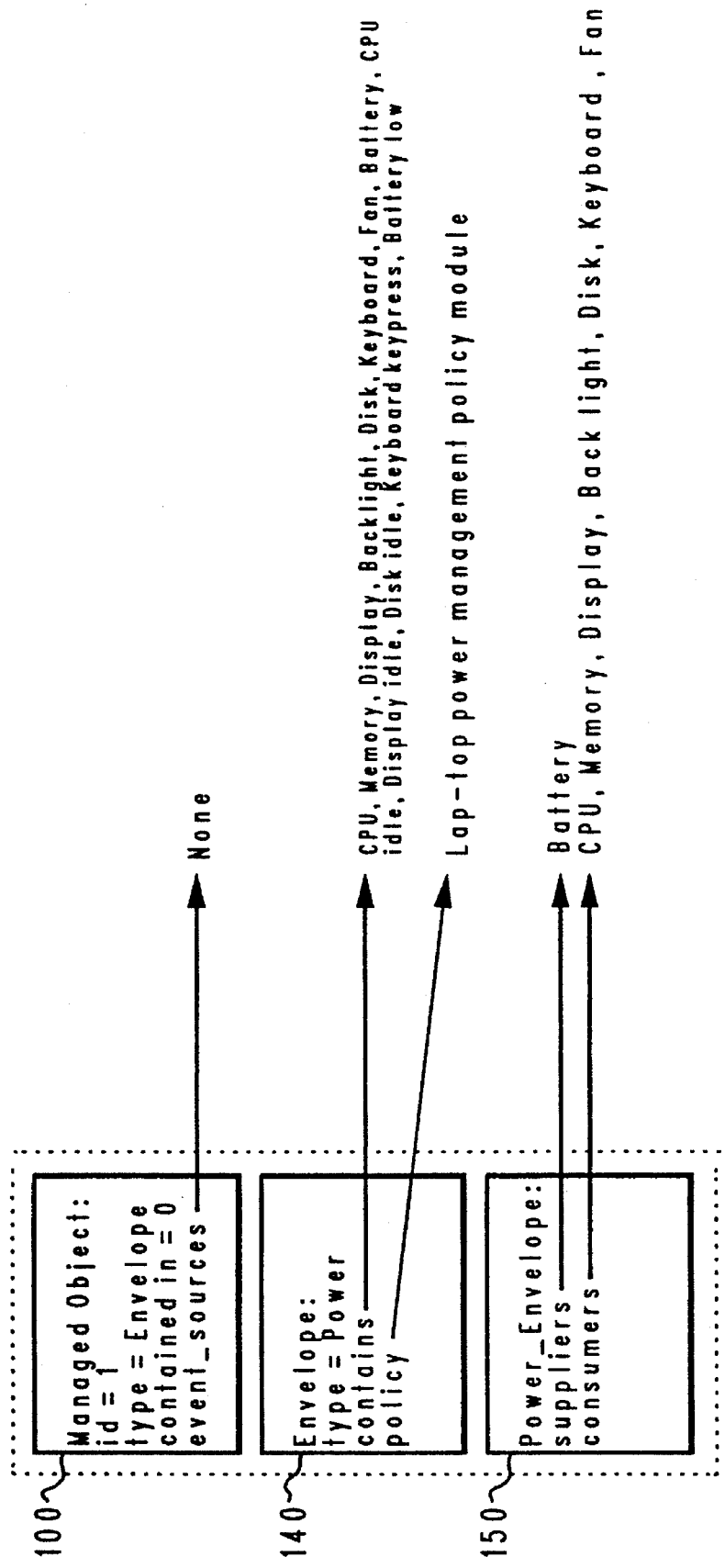
FIG. 3 graphically depicts the contents of a power envelope object.

Referring now to FIG. 3, there is shown a graphical depiction of the contents of an "envelope object." "Power envelope object" 100 embodies the objects used to control electrical power. A "thermal envelope object" would embody the objects used to control thermal transfer. Managed Object 1 is identified to the power management architecture by its I.D. number "1". Its type is identified as an "Envelope" Managed Object, indicating that it provides a logical container for a class of objects that are managed by the power management. This Managed Object is not contained in any other envelopes as is indicated by the "contained in=0". Also as indicated, the Power Envelope object does not originate an event source. Object 140 identifies the class of objects contained in the envelope. In this case, the envelope is classified as a "power" type, therefore containing only power objects. Also shown is the policy module to which that class is subjected. Object 150 provides information on which physical devices contained in the power envelope are suppliers of power and which are consumers of power. In the laptop computer example, the battery would be indicated as a supplier of power and the CPU, memory, display, back light, disk, keyboard, and fan would all be indicated as consumers.

If the envelope object was a thermal envelope, the battery, CPU, memory, display, back light, disk, keyboard and fan would all be indicated as sources of heat. But the fan, being capable of transferring heat by convection, would be labeled a heat sink as well.

Figure 4:
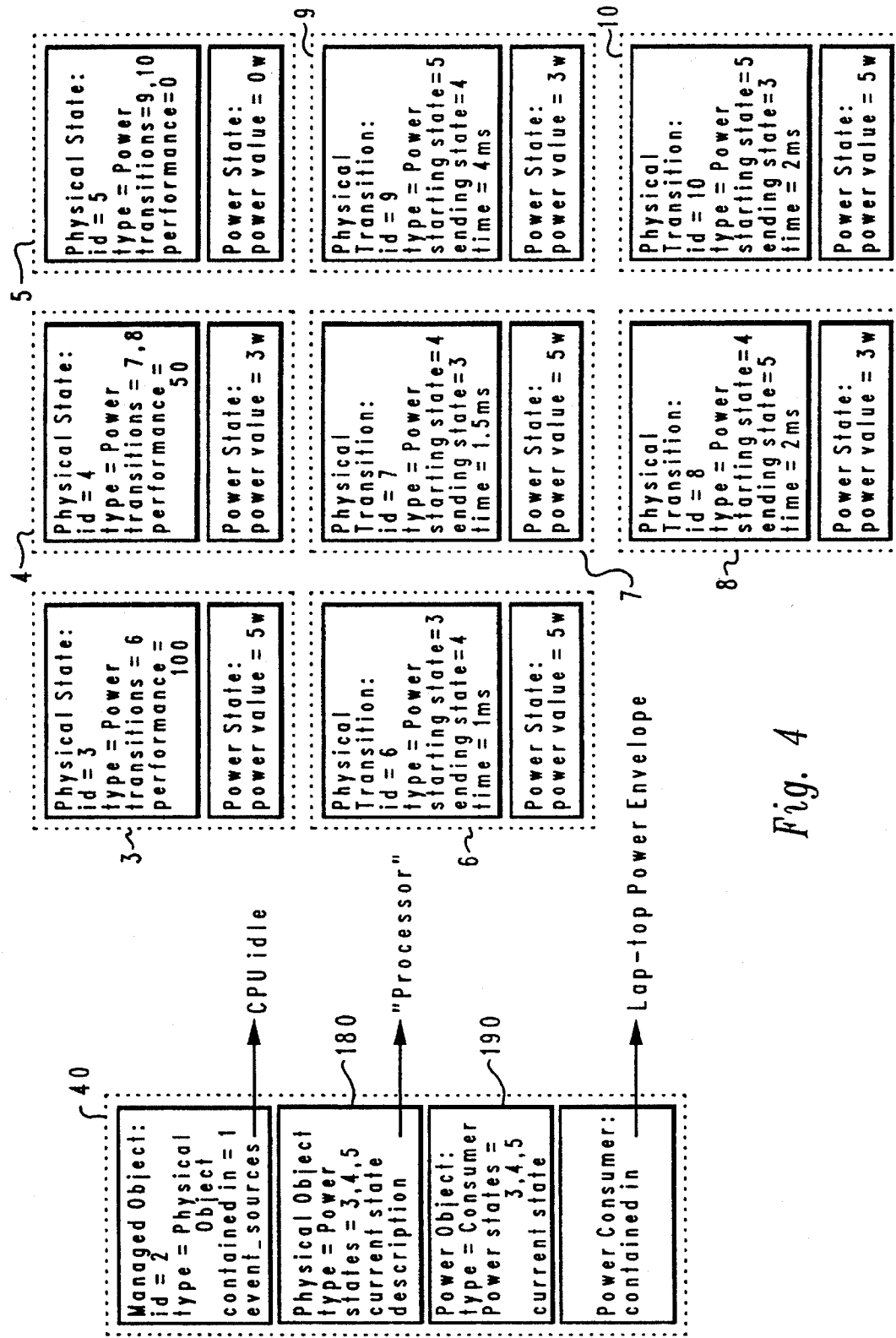
FIG. 4 is a graphical diagram of the objects associated with a physical device according to the present invention.

Referring now to FIG. 4, there is shown a graphical diagram of the logical objects representing a power consumer physical device object, the possible states for that device object and the allowed transitions. Managed Object 2 is identified as I.D. number 2. For this example, the managed device is the CPU. Thus, the Managed Object type is a "Physical Object", which is contained in Managed Object 1, corresponding to the power envelope 100. Thus, Managed Object 2 is the CPU power object.

Object 180 identifies the CPU device object as a power object. The power object 190 describes the power specifications of the CPU. The allowed states for the CPU are identified as Physical States 3, 4, and 5. The power object 190 also identifies the current state of the CPU by identifying which of the states 3, 4, or 5 that the CPU is occupying at a given moment in time. "Description" information identifies the physical device corresponding to the Managed Object 2.

Object 190 identifies the physical object 180 as a "consumer" of power. A consumer uses more energy while operating than it produces. The other possible type of power object would be a "supplier." A supplier produces more energy than it consumes while in operation.

As shown in FIG. 4, Physical State 3 is at a 100% performance level for the CPU. The power level required to maintain this physical state is 5 watts. The only allowed transition that the CPU can make from Physical State 3 is by Physical Transition 6. Thus, the CPU is only capable of moving from its 100% performance state through this Physical Transition. The information provided for this Physical Transition includes the state in which the transition will start and the state in which the transition will end. In this case, the transition is from Physical State 3 to Physical State 4. Thus, while operating at full power, the only allowed change in state for the CPU is to reduce to half performance at Physical State 4. This Physical Transition is identified as consuming 5 watts of power and requiring 1 millisecond of time to perform.

Physical State 4 represents the state where the CPU is operating at half performance. While operating in this state, the CPU will consume 3 watts of power. The only allowed transitions from Physical State 4 are indicated as Physical Transition 7 and Physical Transition 8. Physical Transition 7 takes the CPU from 50% performance up to 100% performance as indicated by the starting state of 4 and the ending state of 3. This Physical Transition will require 5 watts of power over a time of 1.5 milliseconds.

Physical Transition 8 allows the CPU to transition from 50% performance to shut down. This is indicated by the starting state 4 and the ending state 5. This transition consumes 3 watts of power and takes 2 milliseconds of time.

If the CPU is presently shut down, its current state is Physical State number 5. In this state, the CPU does not consume any power. The allowed physical transitions from this state are Physical Transition 9 and 10. Physical Transition 9 takes the CPU from shut down into 50% performance. Physical Transition 10 takes the CPU from Physical State 5 to Physical State 3, or full power.

An "event source object" is an object which communicates the occurrence of a physical event to a power management controller. An example of an "event source object" would be an object which provides a message to the power management controller 110 when the laptop is plugged into an AC outlet or when power is lost on the AC outlet. As another example, an event source object associated with the keyboard indicates when a key has been pressed.

Figure 5:
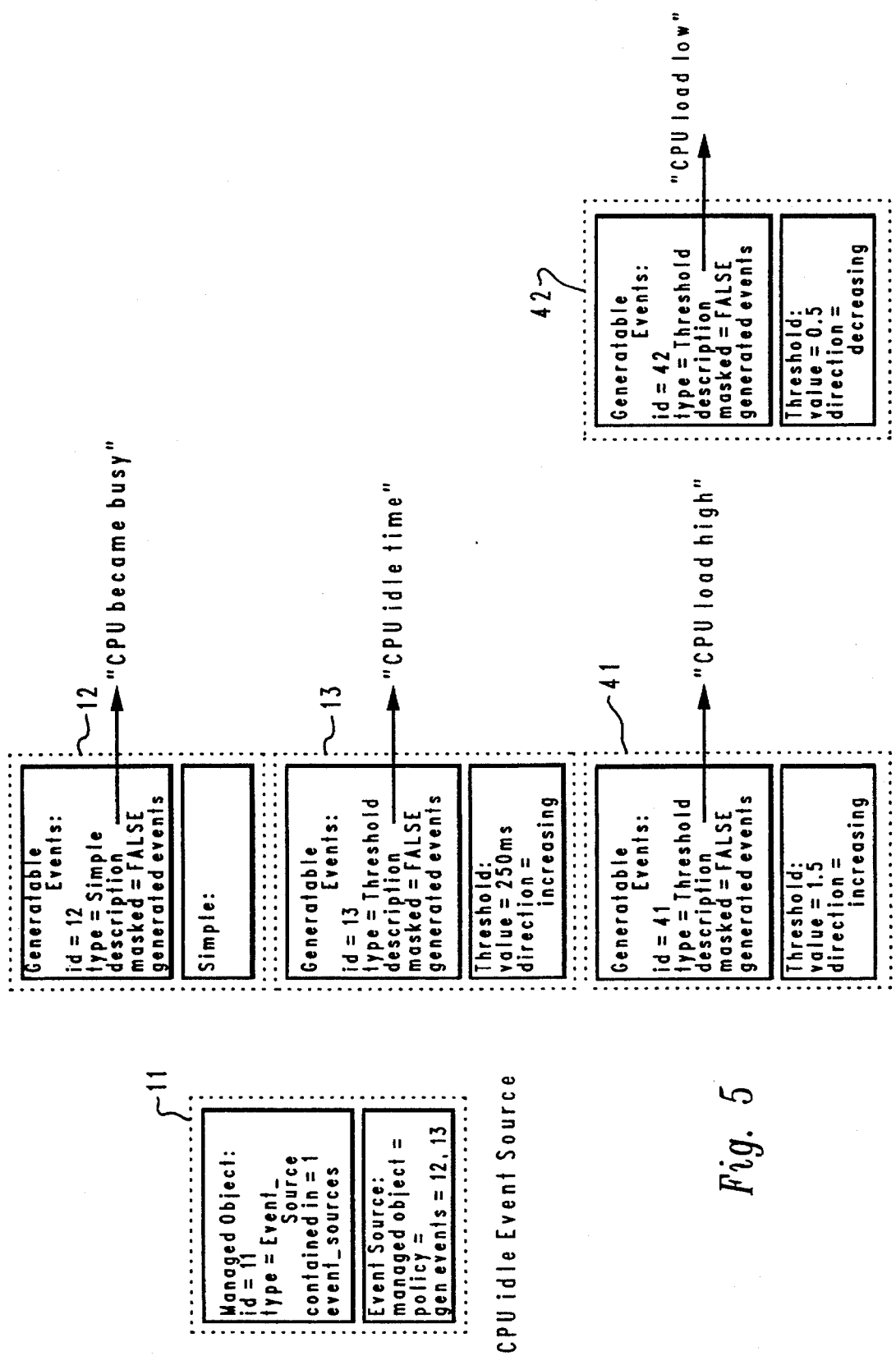
FIG. 5 graphically depicts the contents of an event source object according to the present invention.

Referring now to FIG. 5, Managed Object 11 is an event source object. The attributes listed for this object are that its identification number is 11, it is an event source, it is contained in Managed Object 1, and that the possible Generatable Events by this object are 12, 13, 41 and 42. Another possible attribute could be an indication of the policy module that is a function of this event source. Generatable event 12 describes when the CPU has become busy. Generatable event 13 describes when the CPU has remained idle for a certain specified time. This generatable event is a "threshold" type of event in that this event is generated when the threshold has been exceeded. In this example, it is seen that the threshold value is 250 milliseconds of idle CPU time. Generatable event 41 is a threshold type event indicating that the CPU has been operating at a high load or speed for longer than the threshold value of 1.5 seconds. Generatable event 42 is a threshold type event indicating that the CPU has been operating at a low load for greater than the threshold value of half of a second.

It will be appreciated by those skilled in the art that any number of attributes of a physical device could be reported by the object to the power management controller. The type of information which the Managed Object would provide to the controller will depend on the particular power management scheme the system designer imposes on the computer system. The balance of factors and tradeoffs of features that embody that scheme are integrated into the rules provided by the policy module. These rules may be designed to budget power among the physical devices, to make a tradeoff of power for better performance, or to sacrifice power in order to improve reliability of physical devices. Thus, in implementing the power management, the controller determines whether to change a physical device's state based on the policy module rules as a function of the current state of all the physical devices in the system, any event that has occurred, and the power object information providing the attributes of all possible states and transitional states of the physical devices.

Figure 6:
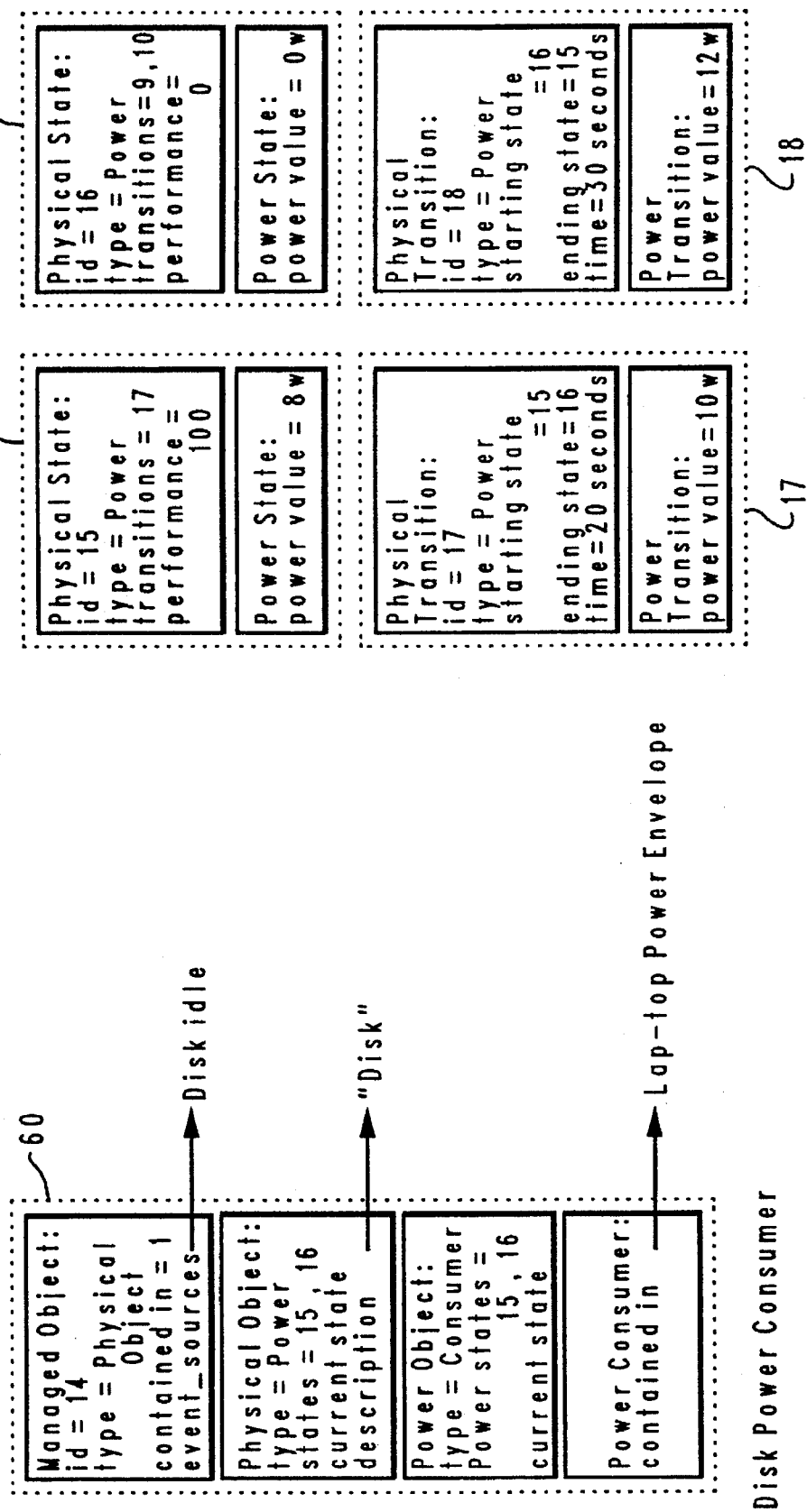
FIG. 6 is a graphical diagram of the physical device according to the present invention.
Figure 7:
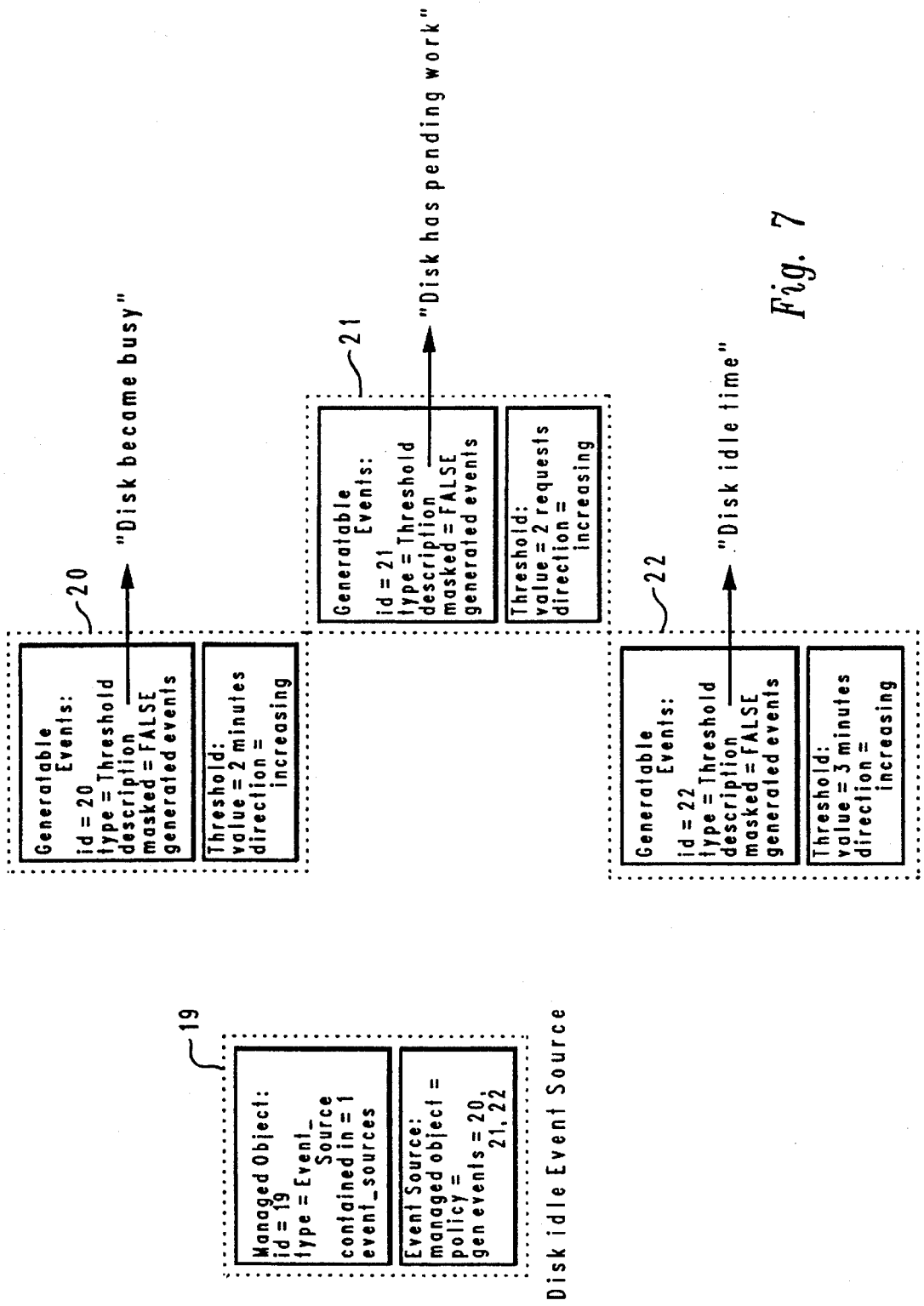
FIG. 7 graphically depicts the contents of an event source object according to the present invention.

A second example of a managed, physical, power consumer is a disk drive whose objects are depicted in FIG. 6 and FIG. 7. Referring to FIG. 6, the displayed attributes of the disk drive object 60 is that the managed object's identification number is 14, it is a physical object, and a power consumer contained in the power management envelope. The two physical states allowed for Managed Object 14 are Physical State 15 and Physical State 16. These physical states are reported to the power management controller by the Managed Object as having the attributes as listed in FIG. 6. These attributes include an identification number for the Physical State, the type of Physical State, the possible transitions from this Physical State and the performance level of this physical device in this state. The disk drive has a Physical State 15 of "spun up", where the disk drive is operating at full power and is consuming 8 watts. From this spun up state there is only one physical transition, Physical Transition 17. This Physical Transition takes 20 seconds and consumes 10 watts of power. This "spin down" Physical Transition takes the disk drive from the spun up state to the "spun down" state of Physical State 16. In Physical State 16 the disk drive consumes no power, and is only allowed to change states through one physical transition, Physical Transition 18. This physical transition takes the disk drive from a spun down state to the spun up state. To spin up, the disk drive consumes 12 watts of power for 30 seconds.

In a similar manner to the CPU example, an event object presents signals to the controller indicating a reportable event has occurred in the disk drive. As shown in FIG. 7, Managed Object 19 provides three generatable events (signals or messages) to the controller. These are Generatable Event 20, indicating that the disk has become busy, Generatable Event 21 indicating the disk has pending work and Generatable Event 22 indicating that the disk has remained idle for a certain period of time. These generatable events are all threshold type events which require either some minimum time, or in the case of Generatable Event 21, a minimum number of disk access requests. When the threshold is met, the event source sends a generatable event signal. Although Managed Object 19 has been described as a separate object, the disk drive object could function as an event source object by being capable of maintaining generatable events. For example, disk drive object 60 could have the dual function of acting as the disk drive power consumer object and as an event source object of disk drive generatable events.

Figure 8:
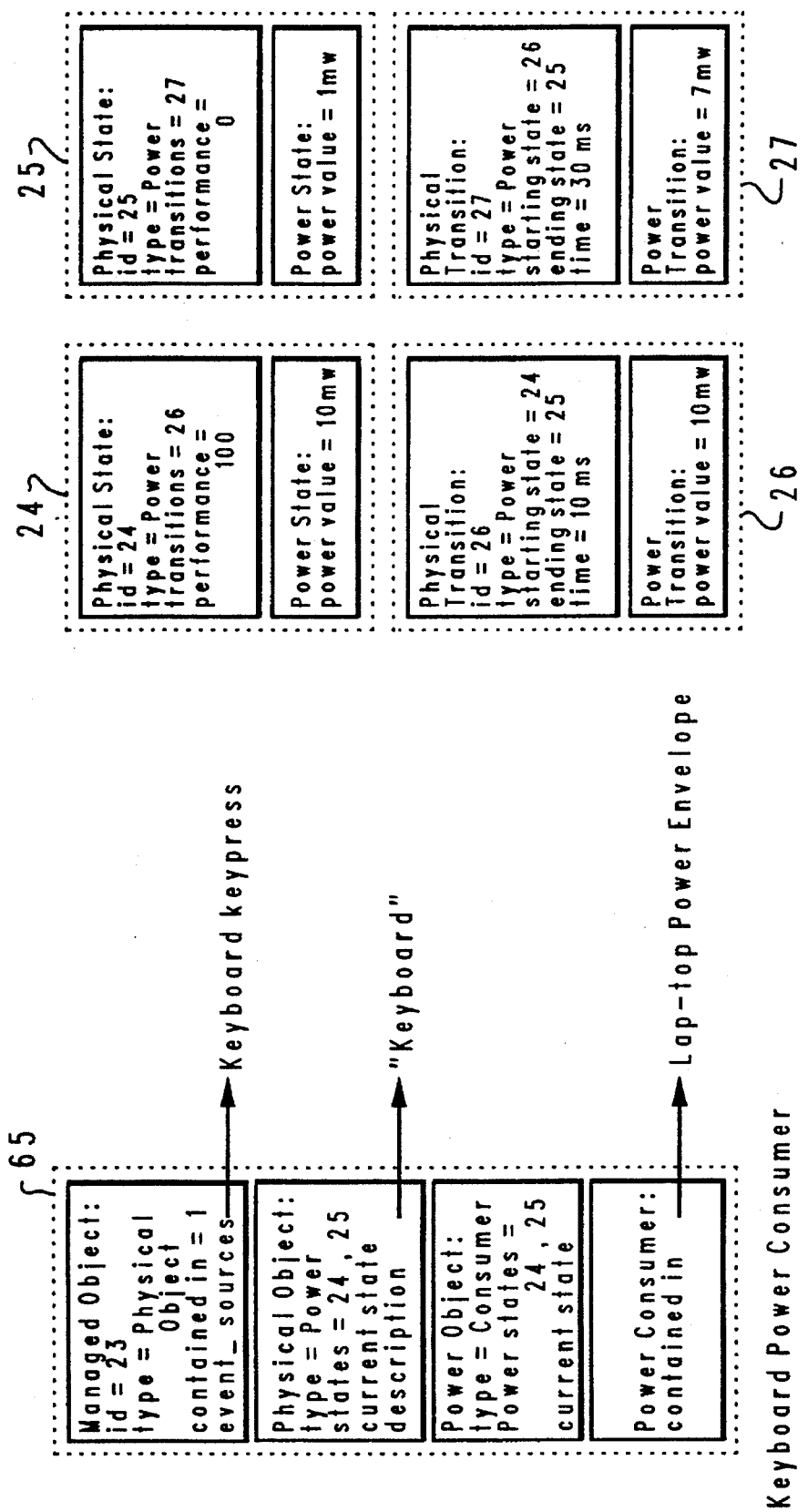
FIG. 8 is a graphical diagram of the physical device according to the present invention.
Figure 9:
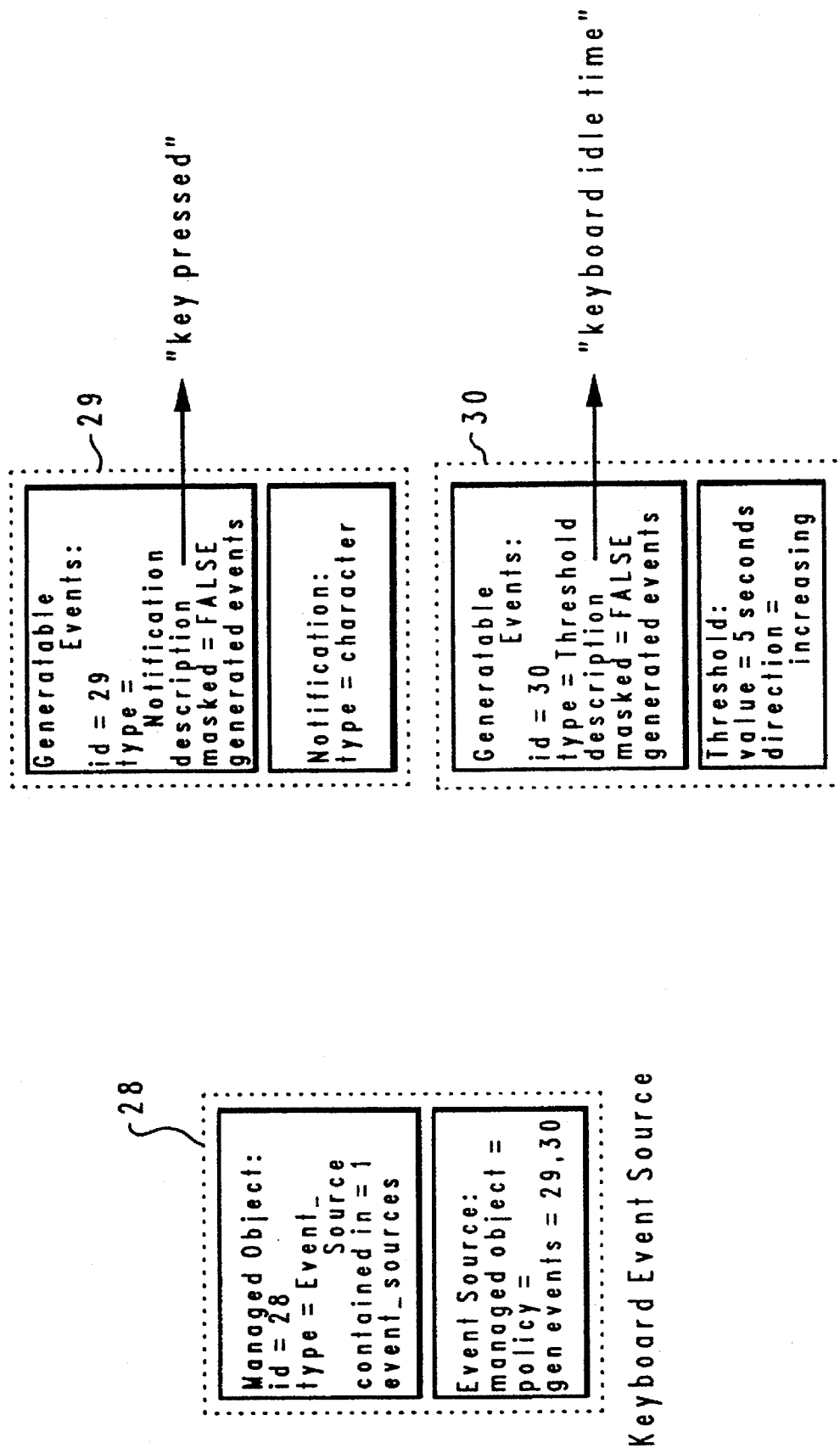
FIG. 9 graphically depicts the contents of an event source object according to the present invention.

Referring now to FIG. 8, there is shown a graphical representation of the power object 65 for a third example of a physical power consumer, a computer keyboard. The keyboard Managed Object 23 has Physical State 24, the state of 100% performance, and Physical State 25, the state of zero performance. The only allowed physical transitions, Physical Transition 26 and 27, describe the specifications for transferring the keyboard from full operation to shut down. In FIG. 9, Managed Object 28 is an event source object having two generatable events. Generatable Event 29 signals when a key has been pressed, and Generatable Event 30 is a threshold type event source signal indicating keyboard idle time.

Thermal objects are created in a similar way. A thermal object would correspond to a physical device. The thermal object would contain information about the thermal requirements or specifications of each possible state for that physical device. Moreover, the thermal object would transmit the current state of the physical device and provide a thermal value for that state. This thermal value could be an actual temperature as sensed from a temperature sensor, or it could be the heat transfer of the physical device as measured in watts.

A very simplistic example of the types of rules that are programmed into the policy module 120 by the power management system designer are shown in FIG. 10. Displayed is a table having three columns. Column one is the "event" column, describing ten possible events which would be sensed and communicated as an event by an event source object. Row one and row two involve the same event, the "CPU became busy." The rules of policy module 120 would require that the controller look at the condition of the system state, and in particular, the power load on the battery, as shown in the "conditions" column. Having access to the power object for the battery, the controller is able to obtain the current state of the battery in order to compose the system model. The controller will know whether the power load on the battery is low or high. Depending on the result, the policy module rules require a specific action, as shown in the "action" column. If the power load on the battery is low, the rules require that the CPU be placed into state number 3. If the power load on the battery is high, the rules require that the CPU be placed into state number 4. In this particular example, the controller determined whether to change the current state of the CPU, and to which state the CPU should be transferred, based on the policy module rules as a function of the system state (i.e. the condition of the system), and in the event. In this example, if the power load on the battery was low and the current state of the CPU was state number 3, the controller would determine that the required action was no action at all. However in that example, if the power load on the battery was high, the CPU would be switched from state number 3 to state number 4.

Row number three and row number four show examples of policy module rules that are functions only of events. If the CPU is idle, the rule in row number three requires that the CPU be placed in state number 5. The condition of the system is irrelevant when processing that particular rule. Row number six and row number seven provide similar examples pertaining to the disk drive.

Row number eight exemplifies a more complex policy module rule. This rule requires that the controller determine whether to change a physical device state, or the system state, based on the policy module rule as a function of the system state, power object attributes, and an event. For this example, the event source is that the disk is idle. The conditions under which this rule is implemented require the controller to take into account both the current state of the disk drive and the disk drive attributes as reported by the disk drive power object. The disk drive power object has provided information that includes the time for the disk drive to spin down, $T_{sd}$, the power consumed in making this state transition of spinning down, $P_{sd}$, the time it will take the disk drive to spin up again, $T_{su}$, the power consumed by the disk drive to make the state transition of spinning up, $P_{su}$, and the power consumed by the disk drive while staying in the spinning state, $P_s$. Thus, the controller can make the "condition" calculation, and then, based on the expected idle time, determine whether the action of placing the disk into state number 16 is required. In this way, the power management architecture designer has created a rule which allows the controller to determine the most efficient course of action by weighing the power consumed by leaving the disk drive in its current spinning state against the overall power consumption of spinning the disk down and then spinning the disk back up to be used at a later time.

The examples of FIG. 10 exemplify the flexibility attained by the power management architecture of the present invention. The power objects, event objects and the policy module all function with the controller independent of the specific type of hardware in which the power management architecture has been implemented. In accordance with the present invention, the framework and functions of the power management architecture provide a power management system for use in any computer platform desired. Thus, the present invention can be used in a laptop computer or in a massive multiprocessor system. However, to be implemented in a system, the physical objects need to be configured for specific attributes of the corresponding physical device to which it is assigned. Moreover, a broad based generic policy module, not designed for a specific system, may not promote sufficient efficiency in a particular application. Thus, the policy module could be designed with more hardware specific rules.

Figure 11:
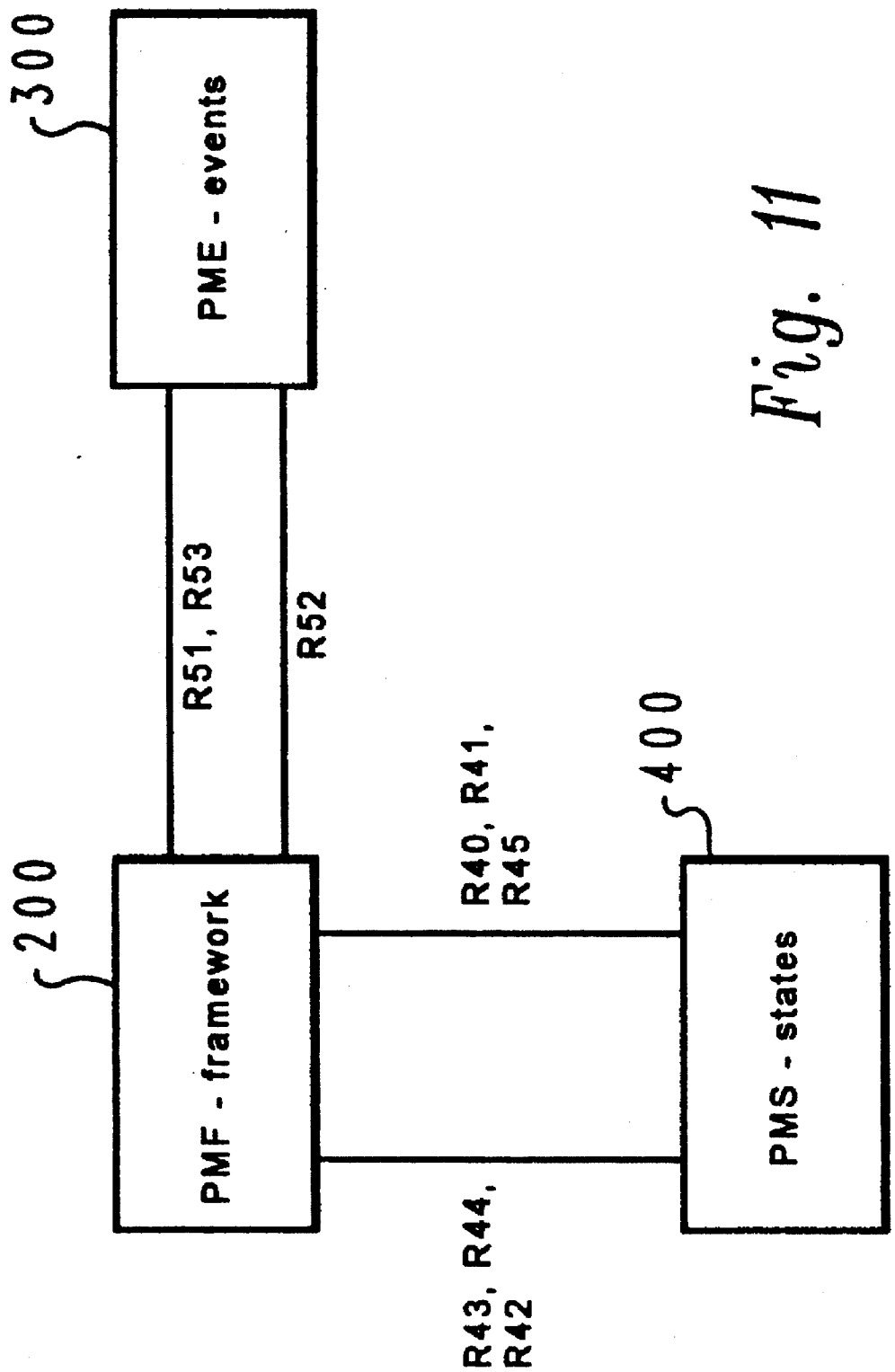
FIG. 11 depicts a subsystem relationship model of an alternative preferred embodiment of the preferred invention.

Referring now to FIG. 11, there is depicted a subsystem relationship model of an alternative preferred embodiment of the present invention. The alternative preferred embodiment of the present invention is an object-oriented power management architecture. Power management framework (PMF) 200 is the subsystem containing the objects and devices that comprise the elemental structure of power management. The power management events subsystem (PME) 300 contains and handles all event objects including generatable events. The relationship between PMF 200 and PME 300 is defined by the relationships R51, R53 and R52 connecting them. (These relationships are defined below). The power management state subsystem (PMS) 400 contains the objects that define the physical states and physical transitions of the power management. PMS 400 is connected to PMF 200 through two sets of relationships: R42, R43, and R44 as one set, and R40, R41 and R45 as a second set. (These also are defined below.)

Figure 12A:
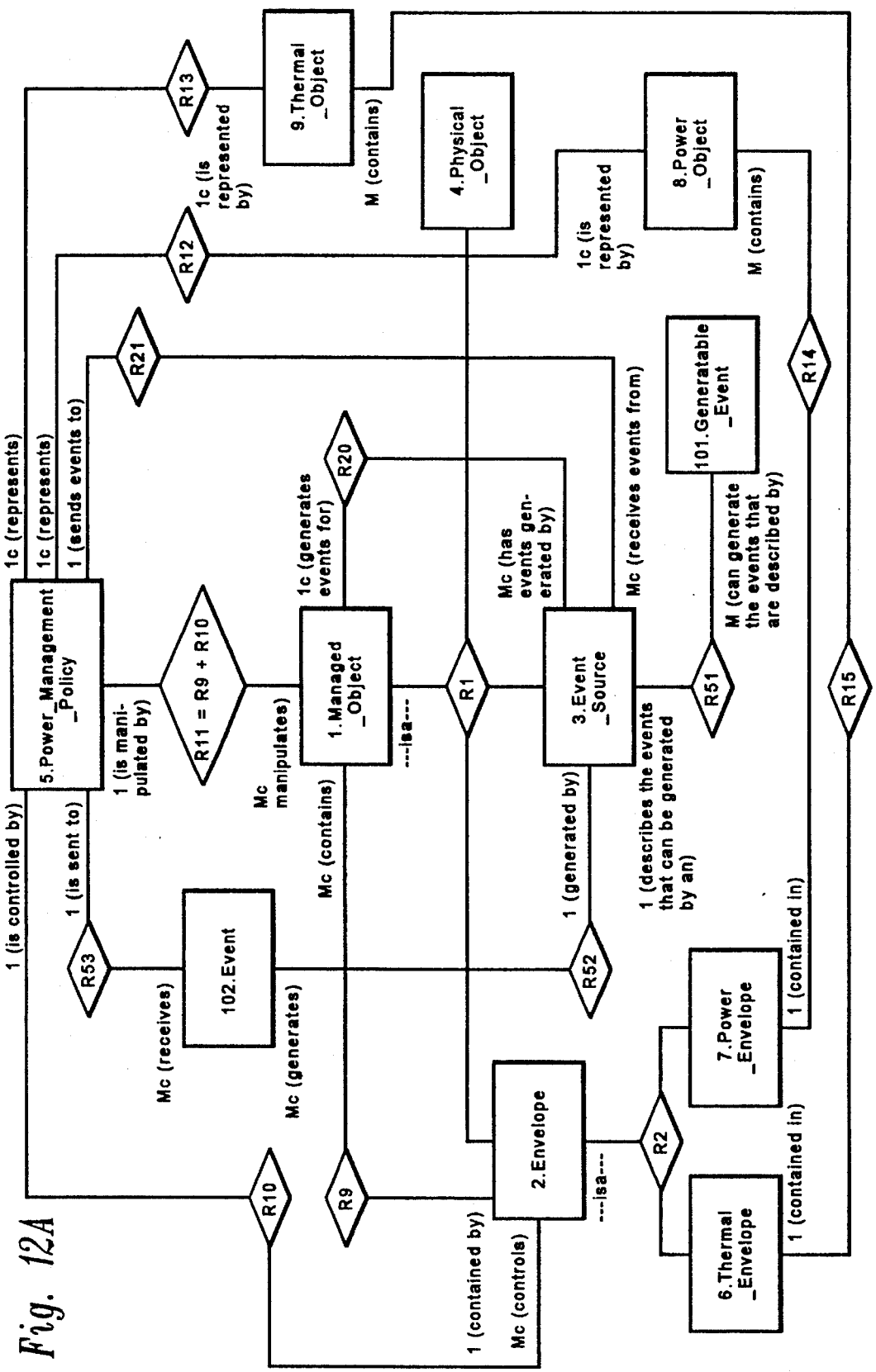
FIG. 12A and 12B depict the Power Management Framework including its objects and the relationships between objects.
Figure 12B:
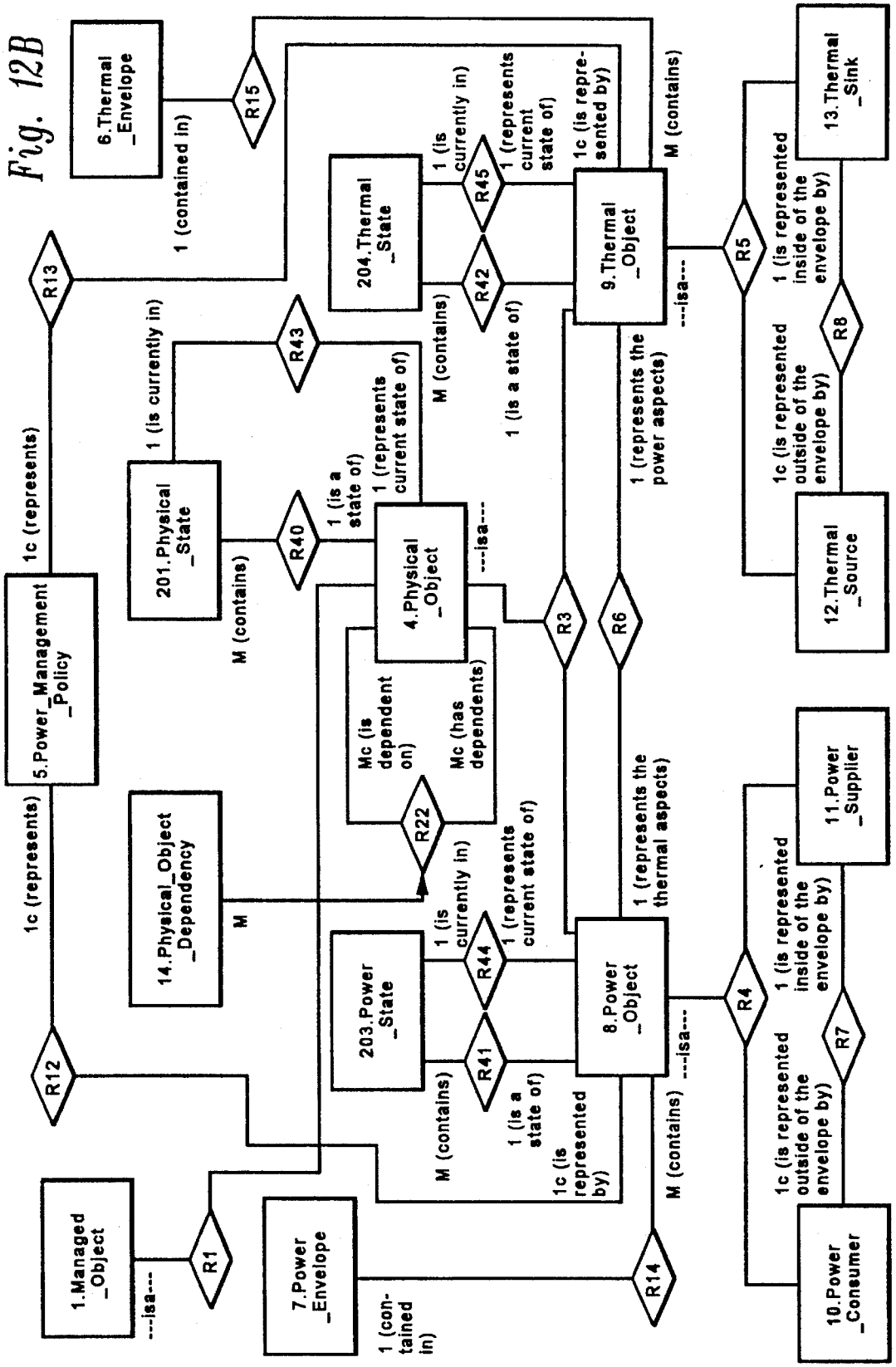
Figure 13:
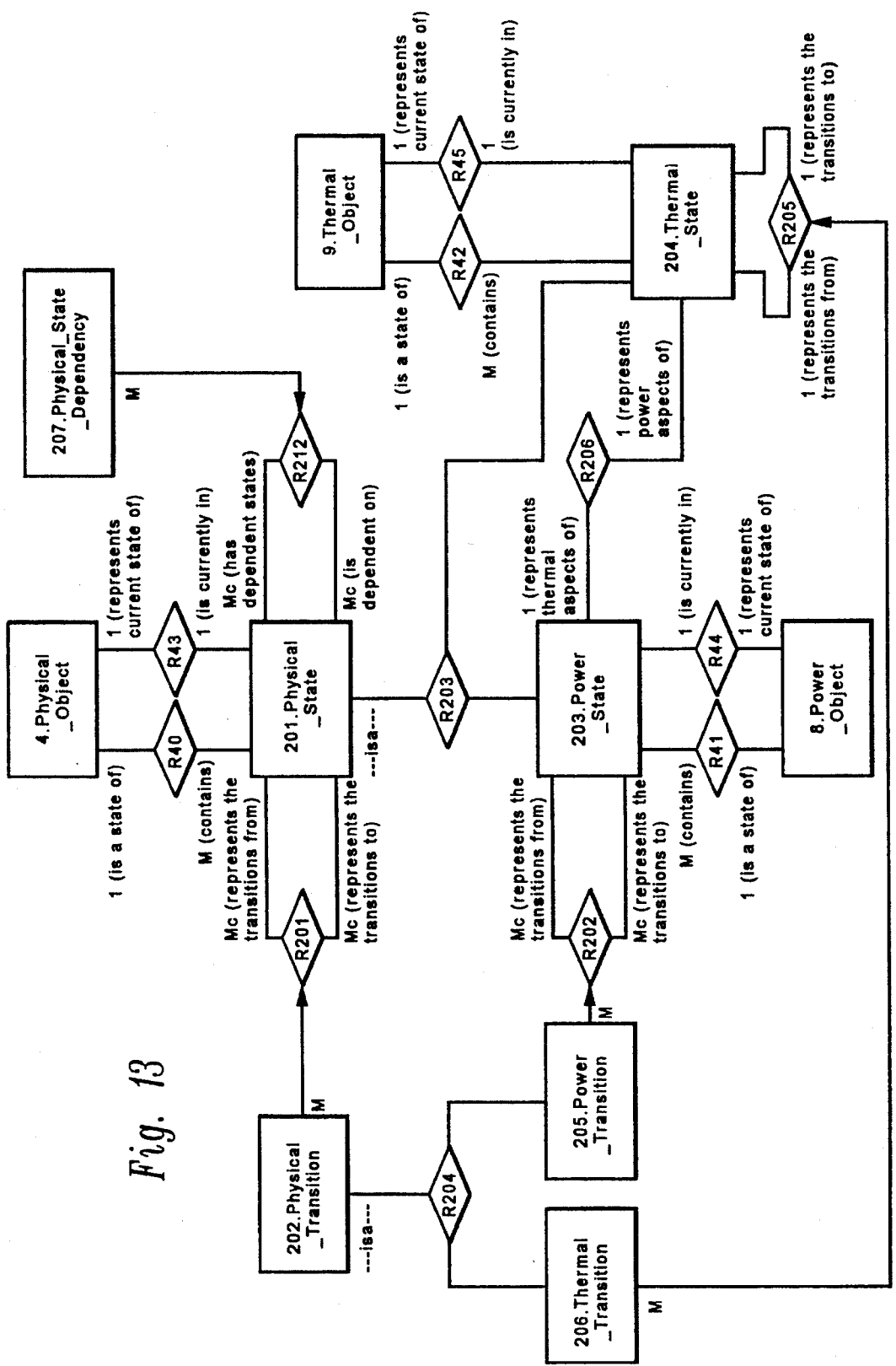
FIG. 13 diagrams the Power Management States Subsystem including its objects and the relationships between objects.
Figure 14:
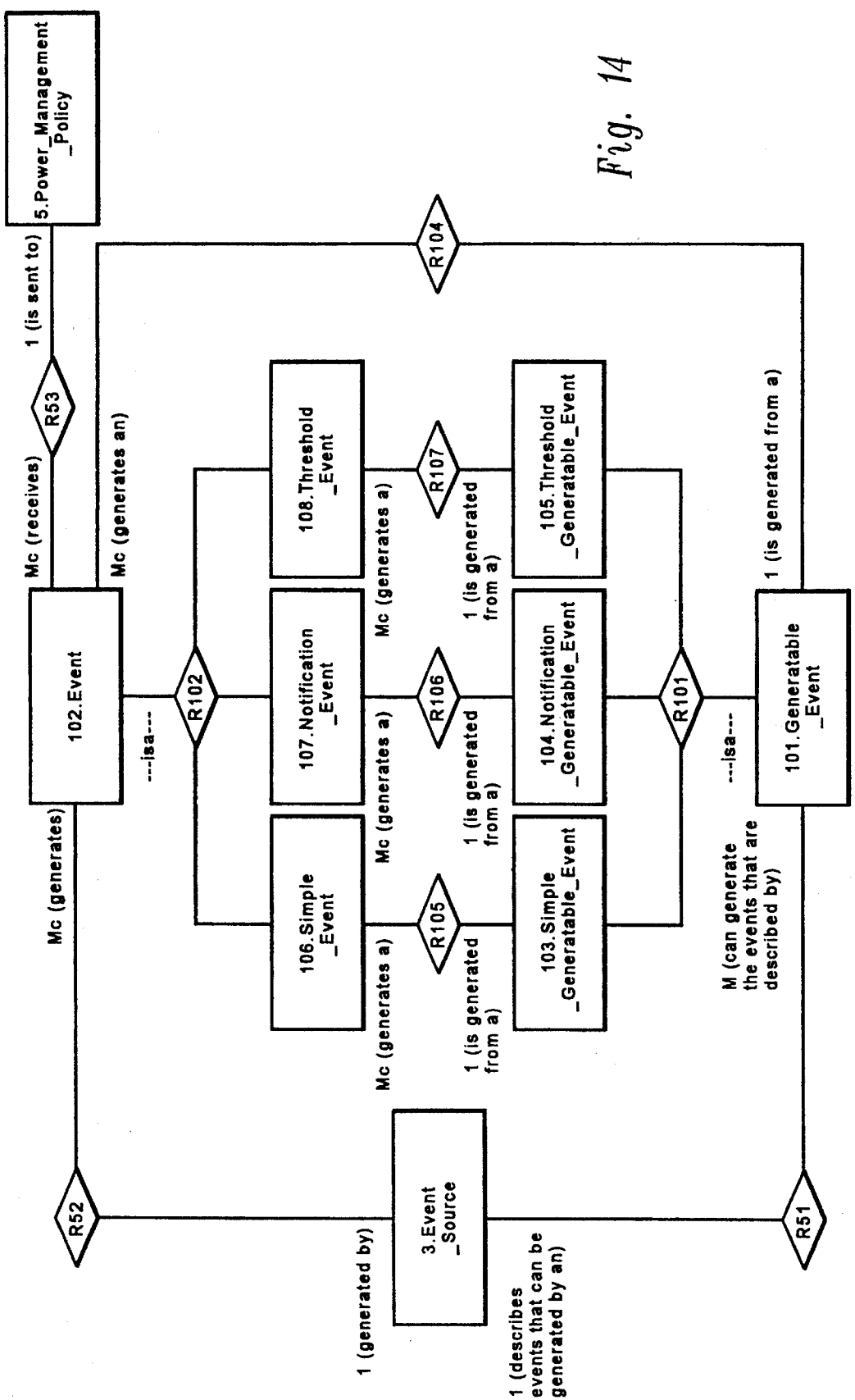
FIG. 14 diagrams the Power Management Event Subsystem including its objects and their relationships.

In order to simplify the description of FIGS. 12–14 all objects and all relationships are described using a standard format. In the figures, boxes represent objects, and diamonds represent a relationship between two objects. In the following listing the standard format for objects (i.e. boxes in the diagram) is as follows:

[#]. [object name] [Object attribute, etc.]

Description: [A description of the object and its characteristics.]

Underneath each object description, there is included a description for each of the attributes provided by that object. The format for those attributes is as follows:

[#].X [ relationship name]

Description: [An explanation of the attribute]

The relationships between objects, shown as diamonds in the diagrams, are also presented in a standard format as follows:

R[#]. [relationship]

Description: [A simple description of the relationship.]

Note that the identification number in front of the name of an object and the identification number in front of the name of a relationship correspond to the reference numerals in the figures.

The notation used in the figures which identify the functions of relationships is derived from the well known Shlaer-Mellor notation. This notation is well known in the art. A description of this notation is given in Shlaer and Mellor, "Object Oriented Systems Analysis: Modeling The World In Data", 1988 and in Shlaer and Mellor, "Object Life Cycles: Modeling The World In States", 1992. The notation provided here differs only slightly from that used by Shlaer-Mellor in that arrow heads are not used. Instead a one-two-one relationship is indicated by labelling each side of the relationship connectors with a "1." A relationship name from the perspective of each of the participating objects is added to the connecting lines and is set off by parenthesis. Multiplicity refers to the number of instances of an object that take part in a relationship and is indicated by an "M." The three fundamental multiplicity relationship forms are one-to-one, one-to-many, and many-to-many. These relationships are indicated on the diagrams using "1" or "M." Conditionality indicates whether each instance of an object must take part in a relationship in a conditional relationship there can be some instances of an object that do not participate in the relationship. The letter "C" is used to indicate conditionality on the diagram and is placed next to the relationship phrase that is sometimes true.

Referring now to FIG. 12–14, the following listing describes the objects contained in the figures, and the specific details that the power management framework is assuming as to how these objects behave. Following a listing of objects, a listing of relationships is provided which describes the relationships between the objects. FIG. 12A and FIG. 12B depicts the Power Management Framework including its objects and the relationships between objects. FIG. 13 diagrams the Power Management States Subsystem including its objects and the relationships between objects. FIG. 14 diagrams the power management events subsystem including its objects and their relationships.

Object and Attribute Descriptions
for the
mk.power_mgmt.framework Subsystem

1. Managed_Object
             (managed_object_id,
              managed_object_type,
              containing_envelope_id,
              containing_envelope_type)

Description: A Managed_Object is a representative for some number of physical components in the system. As such they are usually associated with other more general components of the system such as device drivers. In the case of device drivers, it is not to be unexpected that a Managed_Object is actually part of the device driver itself. However, from a conceptual point of view and possibly from an interface implementation point of view, they can be thought of as being separate and independent of the device driver. There may also be cases where they are the only "real" interface that the device driver exports. There are usually many Managed_Objects in the system. To some extent the number of Managed_Objects in the system can be determined by the level of support in the underlying physical implementation of the system. However, major functional components of the system will probably implement managed objects regardless of the underlying support of the component. Managed_Objects are usually passive. They present information about themselves to the Power_Management_Policy but do not do anything of their own accord. To do so, the Managed_Object would be taking on some of the responsibility of the Power_Management_Policy which begins to defeat the goal of separation of mechanism and policy.

1.1 Managed_Object.managed_object_id

Description: The attribute that identifies the Managed_Object.

1.2 Managed_Object.managed_object_type

Description: Describes the type of Managed_Object that is represented by the current instance.

1.3 Managed_Object.containing_envelope_id

Description: This is a reference to the Envelope that directly contains the Managed_Object.

1.4 Managed_Object.containing_envelope_type

Description: This is a reference to the type of Envelope that directly contains the Managed_Object.

2. Envelope
        (managed_object_id,
         managed_object_type,
         envelope_id,
         envelope_type,
         controlling_policy_id)

Description: An Envelope is a container type of object. That is, it contains other Managed_Objects. It can contain other Envelopes as well. Envelopes are used to describe the power and thermal distribution topology in the system. They also provide convenient places to provide the connection between individual Managed_Objects and the Power_Management_Policy, since the policies are usually associated with collections of things rather than with individuals. Every Managed_Object is contained within an Envelope, including other Envelopes. There is one exception to this and that is the notion of the *Universal_Envelope*. This Envelope is special in that it is not contained by any other Envelope. It is the outer-most Envelope and it always exists.

2.1 Envelope.managed_object_id

Description: This attribute links the instance of a Managed_Object to an instance of an Envelope.

2.2 Envelope.managed_object_type

Description: This attribute is used to link an instance of Managed_Object to an instance of Envelope.

2.3 Envelope.envelope_id

Description: This is the attribute that identifies an Envelope. It is composed of two fields from the Managed_Object. Both of these fields together define this attribute.

2.4 Envelope.envelope_type

Description: Describes the type of Envelope that is represented by a particular Envelope.

2.5 Envelope.controlling_policy_id

Description: This is a reference to the Power_Management_Policy that is responsible for the management of the Envelope and its contents.

3. Event_Source
             (managed_object_id,
              managed_object_type,
              event_source_id,
              events_for,
              events_for_type,
              receiving_policy_id)

Description: Event_Sources are the means by which various types of events about the system (in regards to power and thermal management) are delivered to a Power_Management_Policy. There are several different types of Event_Sources, but regardless of their type an Event_Source falls into either of the following categories. The first category of Event_Sources are those that are associated with other Managed_Objects. In this category of Event_Sources, the Event_Source is responsible for sending events to the Power_Management_Policy on the behalf of the associated Managed_Object. An example of this type of Event_Source would be a power failure signal being generated by a power supply. Another example would be a disk device driver indicating that it had been idle for some number of seconds. The second category of Event_Sources are those that are not associated with another Managed_Object. In this category of Event_Sources, the Event_Source usually represents some source of events that the Power_Management_Policy may be interested in but is not represented by another Managed_Object. An example of this type of Event_Source would be a switch on a lap-top's lid that changes states when the lid is either opened or closed. A Power_Management_Policy may wish to be informed of such an event.

3.1 Event_Source.managed_object_id

Description: This attribute links an instance of Managed_Object to an instance of Event_Source.

3.2 Event_Source.managed_object_type

Description: This attribute links an instance of Managed_Object to an instance of Event_Source.

3.3 Event_Source.event_source_id

Description: This is the attribute that identifies an Event_Source. It is composed of two fields from the Managed_Object. Both of these fields together define this attribute.

3.4 Event_Source.events_for

Description: Refers to the Managed_Object that this Event_Source generates events for.

3.5 Event_Source.events_for_type

Description: Refers to the Managed_Object that this Event_Source generates events for.

3.6 Event_Source.receiving_policy_id

Description: Refers to the Power_Management_Policy to which the Event_Source will deliver its events.

4. Physical_Object
   (managed_object_id,
   managed_object_type,
   physical_object_id,
   physical_object_type,
   current_physical_state_id,
   current_physical_state_type,
   physical_object_description)

Description: Physical_Objects are representatives for the physical characteristics of the underlying system's implementation. They serve to model the characteristics of the system that are "interesting" from a power or thermal management point of view and therefore do not contain all of the characteristics that may be "interesting" from other points of view. The other characteristics are better modeled by other parts of the system (such as device drivers). Physical_Objects model two basic characteristics -- power and thermal. Power management is interested in both the power characteristics of a physical entity and its thermal characteristics. In certain systems, management of the thermal aspects of a system may be as important (if not more important) than the power management of the system. From a power management point of view, thermal management is important because it can affect the power consumed by a system. If a system has fans that can be turned on and off based on some thermal criteria (such as internal temperature), the Power_Management_Policy must be aware of this because placing a physical part of the system into a particular power state, may require that one or more fans be turned on which would further increase the power consumption of the system. A Power_Management_Policy must also be aware that in some systems, turning on some part of the system may not exceed the power capacity, but it may exceed the capacity of the system to rid itself of the resultant waste heat that would be generated by that portion of the system.

4.1 Physical_Object.managed_object_id

Description: This attribute links an instance of Managed_Object to an instance of Physical_Object.

4.2 Physical_Object.managed_object_type

Description: This attribute links an instance of Managed_Object to an instance of Physical_Object.

4.3 Physical_Object.physical_object_id

Description: This is the attribute that identifies a Physical_Object. It is composed of two fields from the Managed_Object. Both of these fields together define this attribute.

4.4 Physical_Object.physical_object_type

Description: Describes the type of Physical_Object that is represented by a particular Physical_Object.

4.5 Physical_Object.current_physical_state_id

Description: This attribute references the Physical_State that represents the current state that the Physical_Object is in.

4.6 Physical_Object.current_physical_state_type

Description: This attribute references the Physical_States that represents the current state that the Physical_Object is in.

4.7 Physical_Object.physical_object_description

Description: This attribute describes the Physical_Object. It is used by a Power_Management_Policy to gain additional semantics about the Physical_Object. See the note attached to this attribute.

5. Power_Management_Policy
    (policy_id)

Description: The exact details of what a Power_Management_Policy does will not be covered here. The rational for that is that different Power_Management_Policies will have different system parameters that are important and will different goals for how the system is operate in respect to power and/or thermal management. The Power_Management_Policy will interact with the other objects in the power management subsystem to accomplish its goals.

5.1 Power_Management_Policy.policy_id

Description: This is the attribute that identifies the Power_Management_Policy.

6. Thermal_Envelope
    (envelope_id,
     envelope_type,
     thermal_envelope_id)

Description: A Thermal_Envelope is an Envelope that contains Thermal_Objects. Power_Envelopes are used to describe the thermal topology of the system. A Thermal_Envelope must contain at least one Thermal_Sink and one Thermal_Source.

6.1 Thermal_Envelope.envelope_id

Description: This attribute links an instance of an Envelope with an instance of a Thermal_Envelope.

6.2 Thermal_Envelope.envelope_type

Description: This attribute links an instance of Envelope with an instance of Thermal_Envelope.

6.3 Thermal_Envelope.thermal_envelope_id

Description: This attribute uniquely identifies the Thermal_Envelope. It is composed of two fields whose values are taken from the attributes Envelope.envelope_id and Envelope.envelope_type.

7. Power_Envelope
        (envelope_id,
         envelope_type,
         power_envelope_id)

Description: A Power_Envelope is an Envelope that contains Power_Objects. Power_Envelopes are used to describe the power topology of the system. A Power_Envelope must contain at least one Power_Supplier and one Power_Consumer.

7.1 Power_Envelope.envelope_id

Description: This attribute identifies the Envelope to which the Power_Envelope is related.

7.2 Power_Envelope.envelope_type

Description: This attribute links an instance of an Envelope to an instance of a Power_Envelope.

7.3 Power_Envelope.power_envelope_id

Description: This attribute uniquely identifies the Power_Envelope. It is composed of two fields whose values are taken from the attributes Envelope.envelope_id and Envelope.envelope_type.

8. Power_Object
        (physical_object_id,
         physical_object_type,
         power_object_id,
         power_object_type,
         thermal_object_id,
         thermal_object_type,
         policy_id,
         current_power_state,
         containing_power_envelope)

Description: Power_Objects represent the power aspects of a physical component of the system. It is through the manipulation of Power_Objects that a power management policy is implemented (i.e. Power_Objects) are part of the mechanism of power management). In order to give a Power_Management_Policy the greatest latitude in how it is defined (i.e. a Power_Management_Policy does not have to make many assumptions), all of the power (both supply and consumption) in the system must be represented. This prevents power from "appearing" or "disappearing" in the system that the Power_Management_Policy cannot easily account for. Usually an individual Power_Object represents some well defined physical subcomponent of the system. However, in a large complex systems, a Power_Object may represent some logical component of the system. This logical subcomponent may include its own Power_Management_Policy and it is the interactions with the subcomponent's policy that allows the subcomponent to be controlled. This requires that a Power_Object be able to be used as a representative for a Power_Management_Policy.

8.1 Power_Object.physical_object_id

Description: This attribute links an instance of Physical_Object to an instance of Power_Object.

8.2 Power_Object.physical_object_type

Description: This attribute links an instance of Physical_Object to an instance of Power_Object.

8.3 Power_Object.power_object_id

Description: This attribute uniquely identifies the Power_Object. It is composed of two attributes from a Physical_Object, Physical_Object.physical_object_id and Physical_Object.physical_object_type.

8.4 Power_Object.power_object_type

Description: This attribute defines the type of Power_Object that is represented by a particular instance.

8.5 Power_Object.thermal_object_id

Description: This attribute references a Thermal_Object that will represent the thermal aspects of this Power_Object. This attribute provides the linkage between individual Power_Objects and Thermal_Objects to allow for the unification of power and thermal management.

8.6 Power_Object.thermal_object_type

Description: This attribute references the type of the Thermal_Object that will represent the thermal aspects of this Power_Object.

8.7 Power_Object.policy_id

Description: This attribute when present, allows for a Power_Management_Policy to be nested and therefore be controlled by other Power_Management_Policies. It allows for a Power_Object to represent a Power_Management_Policy in "outer" envelopes. It is through this representative Power_Object that a Power_Management_Policy can be influenced by another Power_Management_Policy.

8.8 Power_Object.current_power_state

Description: This attribute refers to the Power_State that represents the current state of the Power_Object.

8.9 Power_Object.containing_power_envelope

Description: This is a reference to the Power_Envelope that directly contains the Power_Object.

9. Thermal_Object
```
              (physical_object_id,
               physical_object_type,
               thermal_object_id,
               thermal_object_type,
               policy_id,
               containing_thermal_envelope,
               current_thermal_state)
```

Description: Thermal_Objects represent the thermal aspects of a physical component of the system. It is through the manipulation of Thermal_Objects that a thermal management policy is implemented (i.e. Thermal_Objects are part of the mechanism for thermal management). In order to give a Power_Management_Policy the greatest latitude in how it is defined (i.e. the Power_Management_Policy does not have to make many assumptions), all of the heat (both generation and dissipation) in the system must be represented. This prevents heat from "appearing" or "disappearing" in the system that the Power_Management_Policy cannot easily account for. Usually an individual Thermal_Object represents some well defined physical subcomponent of the system. However, in large complex systems, a Thermal_Object may represent some logical component of the system. This logical subcomponent may include its own Power_Management_Policy and it is the interactions with the Power_Management_Policy that allows the subcomponent to be controlled. This requires that a Thermal_Object be able to be used as a representative for a Power_Management_Policy.

9.1 Thermal_Object.physical_object_id

Description: This attribute links an instance of Physical_Object to an instance of Thermal_Object.

9.2 Thermal_Object.physical_object_type

Description: This attribute links an instance of Physical_Object to an instance of Thermal_Object.

9.3 Thermal_Object.thermal_object_id

Description: This attribute uniquely identifies a Thermal_Object. It is composed of two fields. These fields obtain their values from Physical_Object.physical_object_id and Physical_Object.physical_object_type.

9.4 Thermal_Object.thermal_object_type

Description: This attribute defines the type of the Thermal_Object.

9.5 Thermal_Object.policy_id

Description: This attribute when present indicates that the Thermal_Object is used as a representative for a Power_Management_Policy. This allows Power_Management_Policies to be nested in Thermal_Envelopes and to be controlled by "outer" Power_Management_Policies by treating the "inner" Power_Management_Policy as a Thermal_Object.

9.6 Thermal_Object.containing_thermal_envelope

Description: This attribute refers to the Thermal_Envelope that contains this Thermal_Object.

9.7 Thermal_Object.current_thermal_state

Description: This attribute is a reference to the Thermal_State that represents the current Thermal_State of the Thermal_Object.

10. Power_Consumer
                (power_object_id,
                 power_object_type,
                 power_consumer_id,
                 power_supplier_id)

Description: Power_Consumers are the Power_Objects that represent the consumption of power in the system. Usually an individual Power_Consumer represents some well defined physical subcomponent of the system. However, in systems that use nested Envelopes to represent the power distribution topology, a Power_Consumer may have to be used to represent the power consumption needs of a Power_Supplier in one of the inner Envelopes.

10.1 Power_Consumer.power_object_id

Description: This attribute links an instance of Power_Object with an instance of Power_Consumer.

10.2 Power_Consumer.power_object_type

Description: This attribute links an instance of Power_Object to an instance of Power_Consumer.

10.3 Power_Consumer.power_consumer_id

Description: This attribute identifies a Power_Consumer. It is composed of two fields from the Power_Object. Both of these fields together define this attribute.

10.4 Power_Consumer.power_supplier_id

Description: This attribute when present allows the power consumption needs of a Power_Supplier in an inner Power_Envelope to be represented in an appropriate outer Power_Envelope. This allows the power distribution topology to be represented accurately.

11. Power_Supplier
   (power_object_id,
   power_object_type,
   power_supplier_id,
   time_vs_power_consumption)

Description: Power_Suppliers are the Power_Objects that represent the supply of power in the system. In systems that use nested Envelopes to represent the power topology, a Power_Consumer will be used in an outer Envelope to represent the Power_Supplier's power consumption in the outer Envelope.

11.1 Power_Supplier.power_object_id

Description: This attribute links an instance of Power_Object to an instance of Power_Supplier.

11.2 Power_Supplier.power_object_type

Description: This attribute links an instance of Power_Object to an instance of Power_Supplier.

11.3 Power_Supplier.power_supplier_id

Description: This attribute uniquely identifies a Power_Supplier. It is composed of two attributes from Power_Object. Both of these attributes together define this attribute.

11.4 Power_Supplier.time_vs_power_consumption

Description: This attribute indicates the length of time that the Power_Supplier can supply power at the indicated power level.

12. Thermal_Source
   (thermal_object_id,
   thermal_object_type,
   thermal_source_id,
   thermal_sink_id)

Description: Thermal_Sources are the Thermal_Objects that represent the generation of waste heat in the system. Usually an individual Thermal_Source represents some well defined physical sub-component of the system. However, in systems that use nested Thermal_Envelopes to represent the thermal topology, a Thermal_Source may be used to represent the dissipation of heat from a Thermal_Sink in one of the inner Thermal_Envelopes.

12.1 Thermal_Source.thermal_object_id

Description: This attribute links an instance of a Thermal_Object to an instance of a Thermal_Source.

12.2 Thermal_Source.thermal_object_type

Description: This attribute links an instance of a Thermal_Object to an instance of a Thermal_Source.

12.3 Thermal_Source.thermal_source_id

Description: This attribute identifies the Thermal_Source. It is derived from the attributes Thermal_Source.thermal_object_id and Thermal_Source.thermal_object_type.

12.4 Thermal_Source.thermal_sink_id

Description: This attribute allows a Thermal_Source in an exterior Thermal_Envelope to represent the Thermal_Sink in an interior Thermal_Envelope. This defines the flow of heat from an interior Thermal_Envelope to an exterior Thermal_Envelope.

13. Thermal_Sink
        (thermal_object_id,
         thermal_object_type,
         thermal_sink_id)

Description: Thermal_Sinks are the Thermal_Objects that represent the movement of heat from one portion of the system to another. A Thermal_Envelope must contain at least one Thermal_Sink. It is the content Thermal_Envelopes that describe how the thermal load in a system is dealt with.

13.1 Thermal_Sink.thermal_object_id

Description: This attribute links an instance of a Thermal_Object to an instance of a Thermal_Sink.

13.2 Thermal_Sink.thermal_object_type

Description: This attribute links an instance of a Thermal_Object to an instance of a Thermal_Sink.

13.3 Thermal_Sink.thermal_sink_id

Description: This attribute uniquely identifies the Thermal_Sink. It is composed of two fields whose values are obtained from the attributes Thermal_Object.thermal_object_id and Thermal_Object.thermal_object_type.

14. Physical_Object_Dependency
(dependent_upon_object_id, dependent_upon_object_type, dependent_object_id, dependent_object_type)

Description: This object is used to formalize the relationship between two Physical_Objects where one Physical_Object is dependent upon another. The relationship can be such that a dependent Physical_Object can be dependent upon more than one other Physical_Object. A Physical_Object that is dependent upon another can itself be depended upon by a third Physical_Object. A Physical_Object can be dependent upon other Physical_Objects when the first Physical_Object depends upon the other Physical_Object(s) to be in particular state(s) in order for the first Physical_Object to be in a particular state. An example might be with the case of a CPU and memory. The CPU would be dependent upon the state of the memory (i.e. it doesn't make too much sense to have the CPU in a high power state and have the memory turned off).

14.1 Physical_Object_Dependency.dependent_upon_object_id

Description: This attribute refers to the Physical_Object that the Physical_Object is dependent upon.

14.2 Physical_Object_Dependency.dependent_upon_object_type

Description: This attribute refers to the Physical_Object that the other Physical_Object is dependent upon.

14.3 Physical_Object_Dependency.dependent_object_id

Description: This attribute refers to the Physical_Object that is dependent upon the other Physical_Object that is identified by this Physical_Object_Dependency.

14.4 Physical_Object_Dependency.dependent_object_type

Description: This attribute refers to the Physical_Object that is dependent upon the other Physical_Object that is identified by this Physical_Object_Dependency.

```
                          Relationship Descriptions
                                    for the
                         mk.power_mgmt.framework Subsystem
```

R1. Managed_Object is a supertype of Event_Source
    Event_Source is a subtype of Managed_Object
    Managed_Object is a supertype of Physical_Object
    Physical_Object is a subtype of Managed_Object
    Managed_Object is a supertype of Envelope
    Envelope is a subtype of Managed_Object R10. Power_Management_Policy (1) controls Envelope (Mc)
    Envelope (Mc) is controlled by Power_Management_Policy (1)

R11. Managed_Object (Mc) is manipulated by Power_Management_Policy (1)
    Power_Management_Policy (1) manipulates Managed_Object (Mc)

R12. Power_Management_Policy (1c) is represented by Power_Object (1c)
    Power_Object (1c) represents Power_Management_Policy (1c)

R13. Thermal_Object (1c) represents Power_Management_Policy (1c)
    Power_Management_Policy (1c) is represented by Thermal_Object (1c)

R14. Power_Object (M) contained in Power_Envelope (1)
    Power_Envelope (1) contains Power_Object (M)

R15. Thermal_Object (M) contained in Thermal_Envelope (1)
     Thermal_Envelope (1) contains Thermal_Object (M)

R2.  Envelope is a supertype of Thermal_Envelope
     Thermal_Envelope is a subtype of Envelope
     Envelope is a supertype of Power_Envelope
     Power_Envelope is a subtype of Envelope R20. Event_Source (Mc) generates events for Managed_Object (1c)
     Managed_Object (1c) has events generated by Event_Source (Mc)

R21. Event_Source (Mc) sends events to Power_Management_Policy (1)
     Power_Management_Policy (1) receives events from Event_Source (Mc)

R22. Physical_Object (Mc) has dependents Physical_Object (Mc)
     Physical_Object (Mc) is dependent on Physical_Object (Mc)

R3.  Physical_Object is a supertype of Power_Object
     Power_Object is a subtype of Physical_Object
     Physical_Object is a supertype of Thermal_Object
     Thermal_Object is a subtype of Physical_Object R4.  Power_Object is a supertype of Power_Consumer
     Power_Consumer is a subtype of Power_Object
     Power_Object is a supertype of Power_Supplier
     Power_Supplier is a subtype of Power_Object R40. Physical_State (M) is a state of Physical_Object (1)
     Physical_Object (1) contains Physical_State (M)

R41. Power_State (M) is a state of Power_Object (1)
     Power_Object (1) contains Power_State (M)

R42. Thermal_Object (1) contains Thermal_State (M)
     Thermal_State (M) is a state of Thermal_Object (1)

R43. Physical_Object (1) is currently in Physical_State (1)
     Physical_State (1) represents current state of Physical_Object (1)

R44. Power_Object (1) is currently in Power_State (1)
    Power_State (1) represents current state of Power_Object (1)

R45. Thermal_State (1) represents current state of Thermal_Object (1)
    Thermal_Object (1) is currently in Thermal_State (1)

R5. Thermal_Object is a supertype of Thermal_Sink
    Thermal_Sink is a subtype of Thermal_Object
    Thermal_Object is a supertype of Thermal_Source
    Thermal_Source is a subtype of Thermal_Object R51. Event_Source (1) can generate the events that are described by
    Generatable_Event (M)
    Generatable_Event (M) describes the events that can be generated by an
    Event_Source (1)

R52. Event (Mc) generated by Event_Source (1)
    Event_Source (1) generates Event (Mc)

R53. Power_Management_Policy (1) receives Event (Mc)
    Event (Mc) is sent to Power_Management_Policy (1)

R6. Power_Object (1) represents the power aspects Thermal_Object (1)
    Thermal_Object (1) represents the thermal aspects Power_Object (1)

R7. Power_Consumer (1c) is represented inside of the envelope by Power_Supplier
    (1)
    Power_Supplier (1) is represented outside of the envelope by Power_Consumer
    (1c)

R8. Thermal_Sink (1) is represented outside of the envelope by Thermal_Source
    (1c)
    Thermal_Source (1c) is represented inside of the envelope by Thermal_Sink
    (1)

R9. Managed_Object (Mc) contained by Envelope (1)
    Envelope (1) contains Managed_Object (Mc)

Object and Attribute Descriptions
for the
mk.power_mgmt.events Subsystem

101. Generatable_Event
                (generatable_event_id,
                 generatable_event_type,
                 event_source_id,
                 masked)

Description: This object describes a particular type of Event that can be generated by an Event_Source. An Event_Source can potentially generate many different types of Events. Each type of Event is described by a unique Generatable_Event. Generatable_Events also control the generation of the Events that it describes.

101.1 Generatable_Event.generatable_event_id

Description: This attribute uniquely identifies a Generatable_Event instance. Each Generatable_Event has its own unique ID.

101.2 Generatable_Event.generatable_event_type

Description: This attribute identifies the type of the Generatable_Event (i.e. what type of Event can be generated). A Generatable_Event can only generate one type of Event.

101.3 Generatable_Event.event_source_id

Description: This attribute references the Event_Source that generates the Events that are described by this Generatable_Event.

101.4 Generatable_Event.masked

Description: This attribute indicates if the Generatable_Event can generate events. If the Generatable_Event is masked, it cannot generate an event. It can only generate events if it is not masked.

102. Event
    (event_id,
     event_type,
     generatable_event_id,
     generatable_event_type,
     event_source_id,
     policy_id)

Description: This object is responsible for delivering an asynchronous event to a Power_Management_Policy. The Event carries information about the type of event and any additional information that a Power_Management_Policy would need to interpret the Event.

102.1 Event.event_id

Description: This attribute uniquely identifies an Event.

102.2 Event.event_type

Description: This attribute identifies the type of the Event. The value for this attribute is derived from the attribute Event.generatable_event_type (i.e. the type of the Event must be related to the type of the Generatable_Event).

102.3 Event.generatable_event_id

Description: This attribute refers to the Generatable_Event that is responsible for describing this Event.

102.4 Event.generatable_event_type

Description: This attribute refers to the type of the Generatable_Event that describes this Event.

102.5 Event.event_source_id

Description: This attribute is a reference to the Event_Source that generated the Event based upon one of the Generatable_Events belonging to the Event_Source.

102.6 Event.policy_id

Description: This attribute refers to the Power_Management_Policy that is to receive the Event.

103. Simple_Generatable_Event
                            (generatable_event_id,
                             generatable_event_type,
                             simple_generatable_event_id)

Description: A Simple_Generatable_Event is a Generatable_Event that describes how Simple_Events are generated. Simple_Generatable_Events usually describe some physical sensor in the system. It is the Simple_Generatable_Event that describes the sensor to the system so that its values can be returned to the Power_Management_Policy.

103.1 Simple_Generatable_Event.generatable_event_id

Description: This attribute provides a link between an instance of a Generatable_Event and an instance of a Simple_Generatable_Event.

103.2 Simple_Generatable_Event.generatable_event_type

Description: This attribute provides a link between an instance of a Generatable_Event and an instance of a Simple_Generatable_Event.

103.3 Simple_Generatable_Event.simple_generatable_event_id

Description: This attribute uniquely identifies a Simple_Generatable_Event. It is derived from the attributes Simple_Generatable_Event.generatable_event_id and Simple_Generatable_Event.generatable_event_type.

104. Notification_Generatable_Event
                            (generatable_event_id,
                             generatable_event_type, notification_generatable_event_id,
                             notification_type)

Description: A Notification_Generatable_Event is a Generatable_Event that is responsible for describing a Notification_Event. A Notification_Event informs a Power_Management_Policy that some event occurred that requires a fairly complex set of data to be sent back to the Power_Management_Policy.

104.1 Notification_Generatable_Event.generatable_event_id

Description: This attribute provides a link between an instance of a Generatable_Event and an instance of a Notification_Generatable_Event.

104.2
Notification_Generatable_Event.generatable_event_type

Description: This attribute provides a link between an instance of a Generatable_Event and an instance of a Notification_Generatable_Event.

104.3
Notification_Generatable_Event.notification_generatable_event_id

Description: This attribute uniquely identifies an instance of a Notification_Generatable_Event. It is derived from the attributes Notification_Generatable_Event.generatable_event_id and Notification_Generatable_Event.generatable_event_type.

104.4 Notification_Generatable_Event.notification_type

Description: This attribute describes the type of the Notification_Generatable_Event. This attribute also describes the data that is presented to a Power_Management_Policy when a Notification_Event is delivered to it.

105. Threshold_Generatable_Event
(generatable_event_id,
generatable_event_type,
threshold_generatable_event_id,
threshold_value,
threshold_direction)

Description: A Threshold_Generatable_Event is a Generatable_Event that describes how Threshold_Events are generated. Threshold_Events usually describe some attribute of another object that has changed that the Power_Management_Policy is interested in. Usually the Power_Management_Policy is not interested in all changes but only some of them. It would adjust the parameters of a Threshold_Generatable_Event to be informed when the changes are such that the Power_Management_Policy would be interested.

105.1 Threshold_Generatable_Event.generatable_event_id

Description: This attribute links an instance of a Generatable_Event to an instance of a Threshold_Generatable_Event.

105.2 Threshold_Generatable_Event.generatable_event_type

Description: This attribute provides a link between an instance of a Generatable_Event and an instance of a Threshold_Generatable_Event.

105.3
Threshold_Generatable_Event.threshold_generatable_event_id

Description: This attribute uniquely identifies the Threshold_Generatable_Event. It is derived from the attributes Threshold_Generatable_Event.generatable_event_id and Threshold_Generatable_Event.generatable_event_id.

105.4 Threshold_Generatable_Event.threshold_value

Description: This attribute defines the value that when exceeded in the manner described by the attribute Threshold_Generatable_Event.threshold_direction will cause the Event_Source to generate an Event.

105.5 Threshold_Generatable_Event.threshold_direction

Description: The attribute indicates the direction of the change of value that will trigger the sending of an Event.

106. Simple_Event
        (event_id,
        event_type,
        simple_event_id,
        generated_by,
        simple_event_data)

Description: A Simple_Event is responsible for delivering an asynchronous event to a Power_Management_Policy. The Simple_Event carries a very limited amount of information about the Event that is being represented.

106.1 Simple_Event.event_id

Description: This attribute provides a link between an instance of an Event and an instance of a Simple_Event.

106.2 Simple_Event.event_type

Description: This attribute provides a link between an instance of an Event and an instance of a Simple_Event.

106.3 Simple_Event.simple_event_id

Description: This attribute uniquely identifies the Simple_Event. It is derived from the attributes Simple_Event.event_id and Simple_Event.event_type.

106.4 Simple_Event.generated_by

Description: This attribute refers to the Simple_Generatable_Event that is responsible for describing this Simple_Event.

106.5 Simple_Event.simple_event_data

Description: This attribute describes the data that will be delivered to the Power_Management_Policy by the Simple_Event. It usually represents the current state of some sensor in the system.

107. Notification_Event
    (event_id,
    event_type,
    notification_event_id,
    generated_by,
    notification_event_data)

Description: This object is responsible for delivering an asynchronous ``notification'' event to a Power_Management_Policy. A Notification_Event carries with it information about the Event, specifically the data describing the why the Event was sent. Notification_Events are usually set up to inform the Power_Management_Policy that an event occurred that the Power_Management_Policy should be aware of that cannot be satisfied by either of the other two Event types. Usually the information sent by a Notification_Event is more complex than can be expressed with the other Event types.

107.1 Notification_Event.event_id

Description: This attribute provides a link between an instance of an Event and an instance of a Notification_Event.

107.2 Notification_Event.event_type

Description: This attribute provides a link between an instance of an Event and an instance of a Notification_Event.

107.3 Notification_Event.notification_event_id

Description: This attribute uniquely identifies the Notification_Event. It is derived from the attributes Notification_Event.event_id and Notification_Event.event_type.

107.4 Notification_Event.generated_by

Description: This attribute refers to the Notification_Generatable_Event that describes this Notification_Event.

107.5 Notification_Event.notification_event_data

Description: This attribute describes the data that is delivered by the Notification_Event. The data is described by the attribute Notification_Generatable_Event.notification_type.

108. Threshold_Event
        (event_id,
         event_type,
         threshold_event_id,
         generated_by,
         crossing_direction,
         compared_value)

Description: A Threshold_Event object is responsible for delivering an asynchronous event to a Power_Management_Policy. The Threshold_Event informs the Power_Management_Policy that some threshold level has been exceeded. It contains information about the threshold (i.e. the value that caused the event to be generated) that the Power_Management_Policy can use in determining a course of action.

108.1 Threshold_Event.event_id

Description: This attribute links an instance of an Event to an instance of a Threshold_Event.

108.2 Threshold_Event.event_type

Description: This attribute links an instance of an Event to an instance of a Threshold_Event.

108.3 Threshold_Event.threshold_event_id

Description: This attribute uniquely identifies the Threshold_Event. It is derived from the attributes Threshold_Event.event_id and Threshold_Event.event_type.

108.4 Threshold_Event.generated_by

Description: This attribute refers to the Threshold_Generatable_Event that is responsible for describing the Threshold_Event.

108.5 Threshold_Event.crossing_direction

Description: This attribute indicates the direction of the change of value that will trigger the sending of an Event.

108.6 Threshold_Event.compared_value

Description: This attribute contains the value that was compared to determine that a threshold had been exceeded.

Relationship Descriptions
for the
mk.power_mgmt.events Subsystem

R101. Generatable_Event is a supertype of Simple_Generatable_Event
    Simple_Generatable_Event is a subtype of Generatable_Event
    Generatable_Event is a supertype of Notification_Generatable_Event
    Notification_Generatable_Event is a subtype of Generatable_Event

```
        Generatable_Event    is    a    supertype    of
Threshold_Generatable_Event
        Threshold_Generatable_Event    is    a    subtype    of
Generatable_Event R102. Event is a supertype of Simple_Event
      Simple_Event is a subtype of Event
      Event is a supertype of Notification_Event
      Notification_Event is a subtype of Event
      Event is a supertype of Threshold_Event
      Threshold_Event is a subtype of Event R104. Generatable_Event (1) generates an Event (Mc)
      Event (Mc) is generated from a Generatable_Event (1)

R105.   Simple_Event    (Mc)    is    generated    from    a
Simple_Generatable_Event (1)
        Simple_Generatable_Event    (1)    generates    a
Simple_Event (Mc)

R106. Notification_Event (Mc) is generated from a
      Notification_Generatable_Event (1)
      Notification_Generatable_Event    (1)    generates    a
Notification_Event (Mc)

R107.   Threshold_Event    (Mc)    is    generated    from    a
Threshold_Generatable_Event (1)
        Threshold_Generatable_Event    (1)    generates    a
Threshold_Event (Mc)

R51. Event_Source (1) can generate the events that are
described by
      Generatable_Event (M)
      Generatable_Event (M) describes events that can be
generated by an
      Event_Source (1)

R52. Event (Mc) generated by Event_Source (1)
     Event_Source (1) generates Event (Mc)

R53. Power_Management_Policy (1) receives Event (Mc)
     Event (Mc) is sent to Power_Management_Policy (1)
```

Object and Attribute Descriptions
for the
mk.power_mgmt.states Subsystem

201. Physical_State
            (physical_state_id,
             physical_state_type,
             physical_object_id,
             physical_object_type,
             status,
             reliability,
             performance)

Description: A Physical_Object may have any number of Physical_States indicating various characteristics about the Physical_Object that a Power_Management_Policy might be interested in. Every Physical_Object has at least one Physical_State. Simple Physical_Objects whose state cannot be changed (at least from a power or thermal management point of view) are specified by having only one Physical_State. Each Physical_State has a number of attributes that describe the state. A state's particular semantic content is defined only by its attributes. For example, one cannot infer anything about a state by its ordinal relationship to other states. For example, for a given Physical_Object that has eight Physical_States, one cannot infer that Physical_State 5 is more or less consuming than Physical_State 4.

201.1 Physical_State.physical_state_id

Description: The attribute that identifies a specific Physical_State.

201.2 Physical_State.physical_state_type

Description: This attribute describes the type of Physical_State that is represented by the current instance.

201.3 Physical_State.physical_object_id

Description: This attribute refers to the Physical_Object to which this state belongs. The Physical_State must be of a type that is compatible with the Physical_Object (i.e. a Thermal_State cannot refer to a Power_Object).

201.4 Physical_State.physical_object_type

Description: This attribute refers to the type of Physical_Object to which this state belongs. The Physical_State must be of a type that is compatible with the Physical_Object (i.e. a Thermal_State cannot refer to a Power_Object).

201.5 Physical_State.status

Description: This attribute describes the status of the Physical_State. It indicates how the contents of the other attributes of the Physical_State should be treated. When Physical_State.status is inactive, it means that the Physical_State is not the current state of the Physical_Object that the Physical_State belongs to. When Physical_State.status is active, it means that the Physical_State represents the current state of the Physical_Object that the Physical_State belongs to. When Physical_State.status is transitioning_from, it means that the Physical_State was the current state of the Physical_Object but is currently going through a transition to another state. Once the other Physical_State can be made active, this state will be made inactive.

201.6 Physical_State.reliability

Description: This attribute is used to describe the reliability characteristics of a Physical_Object that is in this Physical_State. The use of this attribute is to allow a Power_Management_Policy to determine if for system reliability reasons it should place a Physical_Object into a Physical_State.

Domain: It may be as simple as a simple measure of Mean-Time-Between-Failures (MTBF). It may allow for some more complex expression of the reliability of the Physical_Object in this Physical_State.

201.7 Physical_State.performance

Description: This attribute is used to describe the performance characteristics of a Physical_State. The use of this attribute is to allow a Power_Management_Policy to determine if the cost of being in a particular Physical_State is warranted. This allows a Power_Management_Policy to computer performance versus power or thermal trade-offs in a meaningful and general way.

202. Physical_Transition
                    (starting_state_id,
                     starting_state_type,
                     ending_state_id,
                     ending_state_type,
                     physical_transition_id,
                     physical_transition_type,
                     reliability,
                     transition_time,
                     status)

Description: Physical_Transitions allow for a general means of describing how a Physical_Object is transitioned from one Physical_State to another. Since it is often the case that the transitions are not of zero cost (i.e. they have characteristics that are distinct from both the starting and ending states) and often do not take zero time, Physical_Transitions have associated with them attributes that are necessary to describe the transition so that a Power_Management_Policy does not have to make assumptions about the costs that may be associated with a particular transition. Physical_Transitions are unidirectional only. That is, they describe a one-way arc from the starting state to the ending state. This was done because it is often the case that going from one state (state A) to another state (state B) often has different costs with it than when it goes from state B to state A. There are also cases where it may be possible to go from state A to state B, but there is no direct way from state B back to state A (i.e. a Physical_Object may have to go from state B to state C and then to state A). A Physical_Object must have a complete set of Physical_Transitions created which describes each transition for each state in the Physical_Object.

202.1 Physical_Transition.starting_state_id

Description: This attribute refers to the Physical_State from which the Physical_Transition is to start from. The type of the Physical_Transition must match the type of the Physical_Object. That is, if the starting Physical_State is a Power_State, then the Physical_Transition must be a Power_Transition.

202.2 Physical_Transition.starting_state_type

Description: This attribute refers to the type of the Physical_State from which the Physical_Transition is to start from. The type of the Physical_Transition must match the type of the Physical_Object. That is, if the starting Physical_State is a Power_State, then the Physical_Transition must be a Power_Transition.

202.3 Physical_Transition.ending_state_id

Description: This attribute refers to the Physical_State to which this Physical_Transition will end in. The type of the Physical_Transition must match the type of the ending Physical_State. That is, if the ending Physical_State is a Power_State, then the Physical_Transition must be a Power_Transition.

202.4 Physical_Transition.ending_state_type

Description: This attribute refers to the type of Physical_State to which this Physical_Transitions will end in. The type of the Physical_Transition must match the type of the ending Physical_State. That is, if the ending Physical_State is a Power_State, then the Physical_Transition must be a Power_Transition.

202.5 Physical_Transition.physical_transition_id

Description: This is the attribute that defines the specific instance of a Physical_Transition.

202.6 Physical_Transition.physical_transition_type

Description: This attribute defines the type of the Physical_Transition.

202.7 Physical_Transition.reliability

Description: This attribute is used to describe the reliability characteristics of a Physical_Object as it makes a transition from one Physical_State to another. The use of this attribute is to allow a Power_Management_Policy to determine if for system reliability reasons, it should or should not make the transition from one Physical_State to another. There are a number of physical devices that are very reliable when left in any of a number of states, but can fail prematurely when switched often between those states. This gives a policy additional information that it can use to determine how often it should switch objects from one state to another.

202.8 Physical_Transition.transition_time

Description: This attribute is used to describe the amount of time that it takes for the Physical_Object to make the transition from the starting state to the ending state. There are a number of physical devices where this time is not insignificant. This allows a policy to determine if the expected work load warrants the transition from one state to another.

202.9 Physical_Transition.status

Description: This attribute indicates the status of the Physical_Transition. When the value of Physical_Transition.status is inactive, the Physical_Transition is not being used to transition between Physical_States at this time. When the value of Physical_Transition.status is active, the Physical_Transition is currently being used to transition between one Physical_State and another. Once the transition has been made, the value of Physical_Transition.status is set back to inactive.

203. Power_State
   (physical_state_id,
   physical_state_type,
   power_state_id,
   thermal_state_id,
   power_object_id,
   power_object_type,
   power_value,
   status)

Description: A Power_State allows the power consumption (or supply) of a Power_Object to be quantified. A Power_Object will have as many Power_States as necessary to represent all of the levels of power consumption (or supply) that may occur in the Power_Object. A Power_State also refers to a Thermal_State so that a Power_Management_Policy can quickly reference the thermal characteristics of a Power_Object in a particular Power_State if that information is required.

203.1 Power_State.physical_state_id

Description: This attribute links an instance of Physical_State to an instance of Power_State.

203.2 Power_State.physical_state_type

Description: This attribute links an instance of Physical_State to an instance of Power_State.

203.3 Power_State.power_state_id

Description: This is the attribute that identifies a Power_State. It is composed of two attributes from the Power_State. Both of these fields together define the value of this attribute.

203.4 Power_State.thermal_state_id

Description: This attribute is a reference to the Thermal_State that represents the thermal attributes of a Power_Object being in a Power_State. Different Power_States may cause the Power_Object to be in different Thermal_States (as defined by the Power_Object's related Thermal_Object). The changing from one Power_State to another, may or may not cause a new Thermal_State to be entered. This reference allows for a simple correspondence to exist between a Power_State and a Thermal_State.

203.5 Power_State.power_object_id

Description: This attribute refers to the Power_Object that this Power_State belongs to.

203.6 Power_State.power_object_type

Description: This attribute refers to the type of the Power_Object that this Power_State belongs to.

203.7 Power_State.power_value

Description: This attribute is used to describe the power consumption of a Power_Object in this Power_State. It may be a simple pre-computed value that represents average (expected) power consumption. It may represent a minimum, maximum and average power consumption. It could be as complex as a computed value function where the Power_Object would compute the power consumption based upon some factors that the Power_Object is aware of (such as the current or expected work it is to do or by querying the underlying hardware implementation).

203.8 Power_State.status

Description: This attribute describes the status of an instance of a Power_State.

204. Thermal_State
            (physical_state_id,
             physical_state_type,
             thermal_state_id,
             thermal_object_id,
             thermal_object_type,
             status,
             thermal_value,
             time_at_thermal_level)

Description: A Thermal_State allows the thermal characteristics of a Thermal_Object to be quantified. A Thermal_Object will have as many Thermal_States as necessary to represent all of the thermal levels that may occur in the Thermal_Object. A Thermal_State also refers to a Power_State so that a Power_Management_Policy may quickly reference the power characteristics of a Thermal_Object in a particular Thermal_State if that information is required.

204.1 Thermal_State.physical_state_id

Description: This attribute provides a link between an instance of a Physical_State and an instance of a Thermal_State.

204.2 Thermal_State.physical_state_type

Description: This attribute provides a link between an instance of a Physical_State and an instance of a Thermal_State.

204.3 Thermal_State.thermal_state_id

Description: This attribute identifies the Thermal_State. It is derived from the attributes Thermal_State.physical_state_id and Thermal_State.physical_state_type.

204.4 Thermal_State.thermal_object_id

Description: This attribute refers to the Thermal_Object to which this Thermal_State belongs.

204.5 Thermal_State.thermal_object_type

Description: This attribute refers to the type of Thermal_Object that this Thermal_State is a part of.

204.6 Thermal_State.status

Description: This attribute describes the status of a particular Thermal_State.

204.7 Thermal_State.thermal_value

Description: This attribute describes the thermal load that is placed on the system by the Thermal_Object when it is in this Thermal_State.

204.8 Thermal_State.time_at_thermal_level

Description: This attribute describes the amount of time that the Thermal_Object can remain in this Thermal_State.

205. Power_Transition
          (physical_transition_id,
          physical_transition_type,
          starting_power_state,
          ending_power_state,
          power_transition_id,
          power_value)

Description: A Power_Transition describes the attributes of a transition from one Power_State to another Power_State. In addition to the characteristics described by a Physical_Transition, a Power_Transition contains a description of the power requirements of the Power_Object while it is in transition from one Power_State to another.

205.1 Power_Transition.physical_transition_id

Description: This attribute links an instance of Physical_Transition to an instance of Power_Transition.

205.2 Power_Transition.physical_transition_type

Description: This attribute links an instance of Physical_Transition to an instance of Power_Transition.

205.3 Power_Transition.starting_power_state

Description: This attribute refers to the Power_State to which this Power_Transition starts from.

205.4 Power_Transition.ending_power_state

Description: This attribute refers to the Power_State to which this Power_Transition will end in.

205.5 Power_Transition.power_transition_id

Description: This attribute uniquely identifies the Power_Transition. It is composed of two attributes whose values are received from the Physical_Transition.

205.6 Power_Transition.power_value

Description: This attribute describes the power requirements to effect the transition from one Power_State to another. The value described by this attribute applies during the entire transition (i.e. for as long as it actually takes to make the transition).

206. Thermal_Transition
      (physical_transition_id,
      physical_transition_type,
      starting_thermal_state,
      ending_thermal_state,
      thermal_transition_id,
      thermal_value)

Description: A Thermal_Transition describes the attributes of a transition from one Thermal_State to another Thermal_State. In addition to the characteristics that are described by a Physical_Transition, a Thermal_Transition contains a description of the thermal requirements of the Thermal_Object while it is in transition from one Thermal_State to another.

206.1 Thermal_Transition.physical_transition_id

Description: This attribute links an instance of a Physical_Transition to an instance of a Thermal_Transition.

206.2 Thermal_Transition.physical_transition_type

Description: This attribute links an instance of a Physical_Transition to an instance of a Thermal_Transition.

206.3 Thermal_Transition.starting_thermal_state

Description: This attribute refers to the Thermal_State that this Thermal_Transition starts from.

206.4 Thermal_Transition.ending_thermal_state

Description: This attribute refers to the Thermal_State that this Thermal_Transition will end in.

206.5 Thermal_Transition.thermal_transition_id

Description: This attribute identifies a Thermal_Transition. It is derived from the attributes Thermal_Transition.physical_transition_id and Thermal_Transition.physical_transition_type.

206.6 Thermal_Transition.thermal_value

Description: This attribute describes the thermal load that the Thermal_Object places on the remainder of the system when it is going through this Thermal_Transition.

207. Physical_State_Dependency
(dependent_upon_state_id,
dependent_upon_state_type,
dependent_state_id,
dependent_state_type)

Description: This object is used to formalize the relationship between two Physical_States where one is dependent upon another. The Physical_States must belong to different Physical_Objects. The relationship can be such that a dependent Physical_State can be dependent upon more than one other Physical_State (in different Physical_Objects). A Physical_State that is dependent upon another can itself be depended upon by a third Physical_State.

207.1 Physical_State_Dependency.dependent_upon_state_id

Description: This attribute refers to the Physical_State that the Physical_State is dependent upon.

207.2 Physical_State_Dependency.dependent_upon_state_type

Description: This attribute refers to the Physical_State that the other Physical_State is dependent upon.

207.3 Physical_State_Dependency.dependent_state_id

Description: This attribute refers to the Physical_State this is dependent upon the other Physical_State that is identified by this Physical_State_Dependency.

207.4 Physical_State_Dependency.dependent_state_type

Description: This attribute refers to the Physical_State that is dependent upon the other Physical_State that is identified by this Physical_State_Dependency.

Relationship Descriptions
                                        for the
                              mk.power_mgmt.states Subsystem R201. Physical_State (Mc) represents the transitions from Physical_State (Mc)
    Physical_State (Mc) represents the transitions to Physical_State (Mc)

R202. Power_State (Mc) represents the transitions from Power_State (Mc)
    Power_State (Mc) represents the transitions to Power_State (Mc)

R203. Physical_State is a supertype of Power_State
      Power_State is a subtype of Physical_State
      Physical_State is a supertype of Thermal_State
      Thermal_State is a subtype of Physical_State R204. Physical_Transition is a supertype of Thermal_Transition
    Thermal_Transition is a subtype of Physical_Transition
    Physical_Transition is a supertype of Power_Transition
    Power_Transition is a subtype of Physical_Transition R205. Thermal_State (1) represents the transitions to Thermal_State (1)
    Thermal_State (1) represents the transitions from Thermal_State (1)

R206. Power_State (1) represents power aspects of Thermal_State (1)
Thermal_State (1) represents thermal aspects of Power_State (1)

R212. Physical_State (Mc) is dependent on Physical_State (Mc)
Physical_State (Mc) has dependent states Physical_State (Mc)

R40. Physical_Object (1) contains Physical_State (M)
Physical_State (M) is a state of Physical_Object (1)

R41. Power_Object (1) contains Power_State (M)
Power_State (M) is a state of Power_Object (1)

R42. Thermal_Object (1) contains Thermal_State (M)
Thermal_State (M) is a state of Thermal_Object (1)

R43. Physical_Object (1) is currently in Physical_State (1)
Physical_State (1) represents current state of Physical_Object (1)

R44. Power_Object (1) is currently in Power_State (1)
Power_State (1) represents current state of Power_Object (1)

R45. Thermal_Object (1) is currently in Thermal_State (1)
Thermal_State (1) represents current state of Thermal_Object (1)

The above description of a preferred embodiment of the present invention has been described in an object-oriented implementation. Those skilled in the art will appreciate that the present invention may be practiced using a variety of software programming techniques other than object-oriented. The objects that have been described could be embodied in a multitude of data sets and software modules that operate and interact in a way identical to that described for the present invention. Although the object-oriented embodiment is preferred, the present invention is not limited to such an embodiment.

According to the present invention, each of the physical objects, power objects and thermal objects contained in the power envelope communicate various attributes of managed physical devices to present a model of the actual physical system that the power management architecture is managing. Power objects convey information about the power consumption or usage of a physical device. Thermal objects convey information about the thermal conditions or heat transfer. The power object will provide information to the power management controller that includes the power requirements of each possible state for that physical device, any and all possible states that the device can be transferred to from any given state, and the transitional power cost of making the transition to that next state. From this information, the controller can build a framework of the system being managed.

A more sophisticated power management architecture will take into account additional information or attributes about each of the physical devices in the system in order to compose an even more complex framework of the managed system. Additional attributes which may be provided by the power object could be the device reliability, or the time it will take to make a transition from one particular state to another. The power objects are also able to determine and then communicate to the controller the state which is currently being occupied, or the "current state", of its corresponding physical device From the set of all current states, the controller is able to build a model of the "system state" as it exists at a particular time.

The controller is also in communication with event objects. A real event in the physical system will generate an event source signal by the event source object. Examples of physical events are the CPU remaining idle for a threshold period of time, the disk drive receiving a threshold amount of requests for access to disk data, and a keyboard keypress. When such events occur, the controller must determine whether to change the system state in response to the event. The controller makes this determination based on the rules provided by the policy module. The policy module rules are a function of the event, the system state, and the information or attributes provided by the power or thermal objects. The event signal received invokes certain rules. These rules analyze the model of the system state in terms of the possible changes to that system state that are allowable within the framework defined by the power objects. From these rules, as they are structured by the power management designer, the controller is dictated an action to be performed, thereby implementing the power management. This action may require that no change be made to the system state, or that the state of any one of the plurality of physical devices be changed.

As a more general power management architecture is contemplated, it should be noted that the thermal loads and characteristics must also be taken into account as this may have some effect on the power used in the system. For example as the internal temperature of a system rises, one or more fans may have to be turned on. Since power consumption and heat generation in a system are usually closely related, it makes sense to expand the notion of power management to include thermal management as well. It turns out that in many cases the mechanisms necessary for thermal management are similar to those required for power management, especially in critical situations (i.e. low power and exceeding thermal limits require similar mechanisms and policies).

The power management architecture of the present invention is intended to be general and comprehensive enough to cover all system types on which power management would be implemented. To achieve this, the architecture is split between its mechanism, comprised of physical objects and event objects, and the policy module containing the rules required to implement the power management architecture on a specific system. The mechanisms have no notion of the policy rules that may be using them. The power management policy module has no specific knowledge of the underlying mechanisms. The controller of the power management effects changes in the power use of the system by using the interfaces provided by the mechanism based on the policy module rules and the objects of the mechanism.

While the invention has been particularly shown and described with reference to a preferred embodiment, it will be understood by those skilled in the art that various changes in form and detail may be made therein without departing from the spirit and scope of the invention.

What is claimed is:

1. A power management architecture in a data processing system, comprising:

a plurality of physical devices, each being either power consumers or power suppliers, wherein each physical device has at least two possible states and a current state which is one of the possible states, and further wherein each state has a corresponding power value, and further wherein the system state is the set of current states for the plurality of physical devices;

a plurality of software objects, each corresponding to a physical device, wherein an object contains information about the power requirements of each possible state for that physical device and the current state of that physical device, the allowed state transitions from each possible state to another, and the power requirements of all possible state transitions;

event means for generating signals indicative of an event;

a policy module containing rules that direct an action, the rules being a function of events and of object information; and a controller, in communication with the physical devices, the objects, the event means and the policy module, for changing the state of any one of the plurality of physical devices in response to a signal indicating an event, the controller determining whether to change a physical device state based on the policy module rules, event signals, and object information, including the power requirements of possible state transitions.

2. A power management architecture in a data processing system according to claim 1, wherein the object information includes attributes of the physical devices that are utilized by the controller when determining whether to change a physical device state.

3. A power management architecture in a data processing system according to claim 1, further comprising a plurality of envelope objects for logically grouping a plurality of objects, the envelope object providing information indicating the objects it contains and what types of objects they are.

4. A power management architecture in a data processing system according to claim 3, further comprising an envelope policy module for managing objects contained in an envelope object containing rules that direct an action by the physical devices that correspond to objects contained in the envelope object, the rules being a function of an event and of object information from the logically grouped plurality of objects in the envelope object.

5. A power management architecture in a data processing system according to claim 3, wherein at least one envelope object logically groups power objects.

6. A power management architecture in a data processing system according to claim 1, wherein an object can generate a signal indicative of an event.

7. A power management architecture in a data processing system according to claim 1, wherein an object contains information about the time required to make the allowed state transitions.

8. A power management architecture in a data processing system according to claim 1, wherein an object contains information about the reliability of the corresponding physical device.

9. A power management architecture in a data processing system according to claim 1, wherein the event means comprises at least one event source object, the event source object communicating the occurrence of a physical event and being associated with a physical device.

10. A power management architecture in a data processing system according to claim 1, wherein the event means comprises the objects, and wherein one or more objects generate signals indicative of a change in the system state.

11. A power management architecture in a data processing system according to claim 1, wherein the physical devices include a disk drive, a CPU, a display, a keyboard, and a battery power supply.

12. A power management architecture in the data processing system according to claim 1, wherein an object contains information about the performance of the corresponding physical device.

13. A method for power management in a data processing system, comprising the steps of:

retrieving object information from a plurality of software objects, wherein an object, each corresponding to a physical device, contains information about the power requirements of each possible state for that physical device and the current state of that physical device, the allowed state transitions from each possible state to another, and the power requirements of all possible state transitions, and further wherein the system state is the set of current states for all physical devices;

retrieving power management rules from a policy module;

receiving a signal indicating an event or a change in the system state; and changing the state of at least one physical device in response to the event or change in the system state, the type of state change performed being determined by applying the power management rules as a function of the event, the system state and object information, including the power requirements of possible state transitions.

14. A method for power management in a data processing system according to claim 13, wherein the object information includes attributes of the physical devices that are that are representative of the physical characteristics of the devices, the attributes being used in applying the rules.

15. A power management architecture in a data processing system, comprising:

a plurality of physical devices, each being either a thermal source or a thermal sink, wherein each physical device has at least one state, and further wherein each state has a corresponding thermal value, and further wherein the system state is the set of current states for the plurality of physical devices;

a plurality of software objects, each corresponding to a physical device, wherein an object contains information about the thermal requirements of each possible state for that physical device and the current state of that physical device, the allowed state transitions from each possible state to another, and the thermal requirements of all possible state transitions;

event means for generating signals indicative of an event;

a policy module containing rules that direct an action, the rules being a function of events and of object information; and a controller, in communication with the physical devices, the objects, the event means and the policy module, for changing the state of any one of the plurality of physical devices in response to a signal indicating an event, the controller determining whether to change a physical device state based on the policy module rules, event signals and object information, including the power requirements of possible state transitions.

16. A power management architecture in a data processing system according to claim 15, wherein the object information includes attributes of the physical devices that are utilized by the controller when determining whether to change a physical device state.

17. A power management architecture in a data processing system according to claim 15, further comprising a plurality of envelope objects for logically grouping a plurality of objects, the envelope object providing information indicating the objects it contains and what types of objects they are.

18. A power management architecture in a data processing system according to claim 17, further comprising an envelope policy module for managing objects contained in an envelope object containing rules that direct an action by the physical devices that correspond to objects contained in the envelope object, the rules being a function of an event and of object information from the logically grouped plurality of objects in the envelope object.

19. A power management architecture in a data processing system according to claim 17, wherein at least one envelope object logically groups thermal objects.

20. A power management architecture in a data processing system according to claim 15, wherein an object can generate an event source.

21. A power management architecture in a data processing system according to claim 16, wherein an object contains information about the time required to make the allowed state transitions.

22. A power management architecture in a data processing system according to claim 15, wherein an object contains information about the reliability of the corresponding physical device.

23. A power management architecture in a data processing system according to claim 15, wherein the event means are at least one event source object, the event source object communicating the occurrence of a physical event and being associated with a physical device.

24. A power management architecture in a data processing system according to claim 15, wherein the event means comprises the objects, and wherein one or more objects generate signals indicative of a change in the system state.

25. A power management architecture in a data processing system according to claim 15, wherein the physical devices include a disk drive, a CPU, a display, a keyboard, and a battery power supply.

26. A power management architecture in a data processing system according to claim 15, wherein an object contains information about the performance of the corresponding physical device.

27. A power management architecture in a data processing system, comprising:

a plurality of physical devices, wherein each physical device has at least one state, and further wherein each state has a corresponding thermal value and a corresponding power value, and further wherein the system state is the set of current states for the plurality of physical devices;

a plurality of thermal software objects, each corresponding to a physical device, wherein a thermal object contains information about the thermal requirements of each possible state for that physical device and the current state of that physical device, the allowed state transitions from each possible state to another, and the thermal requirements of all possible state transitions;

a plurality of power software objects, each corresponding to a physical device, wherein a power object contains information about the power requirements of each possible state for that physical device and the current state of that physical device, the allowed state transitions from each possible state to another, and the power requirements of all possible state transitions;

event means for generating signals indicative of an event;

a policy module containing rules that direct an action, the rules being a function of events, of thermal object information and of power object information; and a controller, in communication with the physical devices, the thermal objects, the power objects, the event means and the policy module, for changing the state of any one of the plurality of physical devices in response to a signal indicating an event, the controller determining whether to change a physical device state based on the policy module rules, event signals and object information, including the power requirements of possible state transitions.

28. A power management architecture in a data processing system according to claim 27, wherein the object information includes attributes of the physical devices that are utilized by the controller when determining whether to change a physical device state.

29. A power management architecture in a data processing system according to claim 27, further comprising a plurality of envelope objects for logically grouping a plurality of physical objects, the envelope object providing information indicating the physical objects it contains and what types of physical objects they are.

30. A power management architecture in a data processing system according to claim 29, further comprising an envelope policy module for managing objects contained in an envelope object containing rules that direct an action by the physical devices that correspond to objects contained in the envelope object, the rules being a function of an event and of object information from the logically grouped plurality of objects in the envelope object.

31. A power management architecture in a data processing system according to claim 29, wherein at least one envelope object logically groups physical objects, wherein physical devices include thermal objects and power objects.

32. A power management architecture in a data processing system according to claim 27, wherein at least one thermal object and at least one power object can generate a signal indicative of an event.

33. A power management architecture in a data processing system according to claim 27, wherein the physical devices include a disk drive, a CPU, a display, a keyboard, and a battery power supply.

34. A power management architecture in a data processing system according to claim 29, wherein each thermal object and each power object contains information about the time required to make the allowed state transitions.

35. A power management architecture in a data processing system according to claim 27, wherein at least one power object and at least one thermal object contains information about the reliability of the corresponding physical device.

36. A power management architecture in a data processing system according to claim 27, wherein the event means comprises the thermal objects and the power objects, and further wherein one or more thermal objects generate signals indicative of a change in the system state, and wherein one or more power objects generate signals indicative of a change in the system state.

37. A power management architecture in a data processing system according to claim 27, wherein the event means are at least one event source object, the event source object communicating the occurrence of a physical event and being associated with a physical device.

38. A power management architecture in the data processing system according to claim 27, wherein an object contains information about the performance of the corresponding physical device.

\* \* \* \* \*